United States Patent
Holt

(10) Patent No.: US 9,817,390 B2
(45) Date of Patent: Nov. 14, 2017

(54) METHOD FOR MACHINING A WORKPIECE

(75) Inventor: Sean Holt, Halesowen (GB)

(73) Assignee: Sandvik Limited, Halesowen (GB)

( * ) Notice: Subject to any disclaimer, the term of this patent is extended or adjusted under 35 U.S.C. 154(b) by 509 days.

(21) Appl. No.: 13/818,017

(22) PCT Filed: Aug. 19, 2011

(86) PCT No.: PCT/GB2011/051567
§ 371 (c)(1),
(2), (4) Date: May 1, 2013

(87) PCT Pub. No.: WO2012/025741
PCT Pub. Date: Mar. 1, 2012

(65) Prior Publication Data
US 2013/0218319 A1  Aug. 22, 2013

(30) Foreign Application Priority Data

Aug. 23, 2010 (GB) .................................. 1014039.0

(51) Int. Cl.
*G05B 19/416* (2006.01)
*B23Q 15/12* (2006.01)

(52) U.S. Cl.
CPC ......... *G05B 19/4163* (2013.01); *B23Q 15/12* (2013.01); *G05B 2219/43124* (2013.01);
(Continued)

(58) Field of Classification Search
CPC G05B 19/182; G05B 19/186; G05B 19/4163; G05B 2219/4312;
(Continued)

(56) References Cited

U.S. PATENT DOCUMENTS

| 5,019,115 A | 5/1991 | Schneider et al. |
| 5,113,728 A | 5/1992 | Medeksza |

(Continued)

FOREIGN PATENT DOCUMENTS

| JP | 61-293704 | 12/1986 |
| JP | 05277801 | 3/1992 |

(Continued)

OTHER PUBLICATIONS

Machine translatin document for JP2003-071601 (Mar. 2003) by Okuma Machinery Works Ltd.*

(Continued)

*Primary Examiner* — Robert Fennema
*Assistant Examiner* — Jigneshkumar Patel
(74) *Attorney, Agent, or Firm* — Patterson + Sheridan, LLP

(57) ABSTRACT

An electronic control system is programmed to control movement of a cutting tool relative to a rotating workpiece. After engagement of the stock, the tool is controlled to follow a curved path until the cutting surface of the tool reaches a predetermined depth of cut in the stock. The tool is then controlled to follow a straight/linear path, with the cutting surface of the tool engaged with the stock at said predetermined depth of cut. The control system varies the feed rate as the tool rolls into cut along a known path of curvature, to control the thickness of the material which is removed as the tool rolls into cut, e.g. to induce fracture as the material begins to coil. The feed rate as the tool rolls into cut is programmed to vary in relation to an arc of engagement between a cutting surface of the cutting tool and the stock into which the cutting tool is being moved.

20 Claims, 27 Drawing Sheets

(52) U.S. Cl.
CPC ............ *G05B 2219/45136* (2013.01); *G05B 2219/49104* (2013.01); *G05B 2219/49233* (2013.01); *G05B 2219/49392* (2013.01); *Y10T 82/10* (2015.01)

(58) Field of Classification Search
CPC ........... G05B 2219/45136; G05B 2219/49104; G05B 2219/49233; G05B 2219/49392; B23D 59/008; B23Q 15/12; Y10T 82/10
USPC ........................................................ 700/160
See application file for complete search history.

(56) References Cited

U.S. PATENT DOCUMENTS

| | | | |
|---|---|---|---|
| 5,291,812 | A | 3/1994 | Yen et al. |
| 2002/0164221 | A1* | 11/2002 | Izutsu et al. ................. 409/132 |
| 2003/0050727 | A1 | 3/2003 | Orczykowski et al. |
| 2005/0246052 | A1 | 11/2005 | Coleman et al. |
| 2006/0291969 | A1 | 12/2006 | Koch |
| 2007/0084317 | A1 | 4/2007 | Stanik et al. |

FOREIGN PATENT DOCUMENTS

| | | |
|---|---|---|
| JP | 06-328303 A2 | 11/1994 |
| JP | 07-136817 A2 | 5/1995 |
| JP | 2003071601 A | 3/2003 |
| JP | 2003-256010 A | 9/2003 |
| JP | 2005-279862 A | 10/2005 |
| JP | 2007-307680 A | 11/2007 |
| KR | 10-2007-0047738 | 5/2007 |
| WO | WO-94/23869 A1 | 10/1994 |
| WO | 0074882 A1 | 12/2000 |
| WO | 2007-091321 A1 | 8/2007 |

OTHER PUBLICATIONS

Combined Search and Examination Report (UK Patent Office); dated Nov. 24, 2010; GB 1014039.0.
International search report for application No. PCT/GB2011/051567 dated Apr. 4, 2012.
Mazakas, Ann, "CAM for C- and Y-Axis Mill-Turn Machining", dptechnology.com.
Mexican Third Office Action dated Jul. 22, 2015 for Application No. MX/a/2013/002110.
Japanese Office Action dated Jul. 21, 2015 for Application No. 2013-525360.
Second Chinese Office Action in related application CN 2011800405638 dated Oct. 14, 2015.
Korean Office Action dated Dec. 12, 2016 for Application No. 10-2013-7005826.

* cited by examiner

METHOD FOR MACHINING A WORKPIECE

The present invention relates a method for machining a workpiece, more particularly a method for removing stock from a rotating workpiece.

Methods for machining a rotating workpiece (a procedure commonly referred to as 'turning') are well-known. However, despite decades of advancement, there are still many issues to be addressed. For example, a common problem with conventional turning methods is that the material which is cut from the workpiece is prone to forming a coil of sharp swarf. Such coils have the potential to scratch, abrade or otherwise degrade adjacent surfaces of the workpiece. This is a particular problem for automated machining, where the coil may go unnoticed for a long period of time. Moreover, the cutting process may need to be interrupted in order to allow the coil to be removed, e.g. via manual intervention.

Cutting tool abrasion is also an issue. An abraded cutting tool produces a less accurate finish. Hence, cutting tools need to be replaced after a period of use. However, the process of replacing a tool is time-consuming, and can reduce the overall production efficiency of a machining apparatus.

The invention mitigates or overcomes one or more of the above problems, or one or more other problems associated with conventional turning methods.

According to the invention, there is provided a method for machining a workpiece, the method comprising the steps of: turning a workpiece and controlling the position of a cutting tool relative to the workpiece in order to remove stock from the workpiece, wherein the method involves a cutting cycle in which the cutting tool is moved in a first direction relative to the workpiece in order to make a first pass and remove stock from the workpiece, the tool is withdrawn from the workpiece after the first pass, and the cutting tool is then moved in a second direction, different to said first direction (e.g. opposite or substantially opposite to said first direction), to make a second pass and remove stock from the workpiece, and wherein the cutting cycle is repeated in order to cut a feature of predefined shape from a predefined portion of the workpiece.

Alternating the direction of each pass of the tool in this manner reduces the likelihood of the removed stock forming a coil. Hence, the risk of surface abrasion of the turning workpiece as a result of swarf contact is greatly reduced, when compared with conventional turning methods. Cutting tool life is also improved.

In exemplary embodiments, the method is automated, wherein a control system (e.g. an electronic control system) is programmed to control movement of the cutting tool relative to the workpiece during the cutting cycles.

In exemplary embodiments, the method comprises a roughing operation for the workpiece (i.e. as opposed to a finishing operation), wherein multiple cutting cycles are used to remove a significant portion of stock from a desired location on a workpiece, (e.g. a virgin surface on a workpiece).

In exemplary embodiments, the cutting tool has first and second cutting surfaces which are used alternately, i.e. so that the first cutting surface is used for a first and a third pass and the second cutting surface is used for a second and a fourth pass, etc. This greatly improves the longevity of the tool.

In exemplary embodiments, the first and second cutting surfaces have a known curvature, e.g. a constant radius. In exemplary embodiments, the first and second cutting surfaces have the same curvature (e.g. the same constant radius). For example, the method may involve use of a cutting tool having a curved cutting surface (e.g. of constant radius), wherein a first part/arc of the cutting surface is used for the first pass and a second part/arc of the cutting surface (e.g. opposite to the first part) is used for the second pass.

In exemplary embodiments, the cutting tool includes a cutting head which is at least partly spherical, e.g. substantially hemispherical or greater, wherein the cutting surfaces are of constant diameter.

In exemplary embodiments, each of said first and second passes involves movement of the tool in order to bring a cutting surface of the tool into engagement with the stock (a process sometimes referred to as 'moving into cut'), movement to cause a cutting surface of the tool to cut a desired thickness of material from a portion of the stock (a process sometimes referred to as 'movement in cut'), and movement to withdraw the cutting surface of the tool from the stock (a process sometimes referred to as 'movement out of cut').

In exemplary embodiments, the movement into cut is controlled to follow a curved path, e.g. a line of curvature that follows a constant radius, in a process sometimes referred to as 'rolling into cut'. This reduces shock to the tool head and the workpiece, thereby increasing the longevity of the tool and reducing the risk of edge fritter.

In exemplary embodiments, the movement in cut is controlled to follow a straight/linear path, wherein the cutting surface of the tool is engaged with the stock at a predetermined depth of cut.

In exemplary embodiments, the control system is programmed for controlling the thickness of the material which is removed from the workpiece as the tool rolls into cut (i.e. until the tool reaches the required depth of cut or start point for the linear cutting operation of the same pass). This reduces the likelihood of coil generation and also reduces temperature loading on the tool, thereby improving the longevity of the tool.

In exemplary embodiments, the thickness (often refereed to as 'chip thickness') is controlled to remain within a desired thickness range, for reducing the likelihood that the removed material will generate a coil of significant length (e.g. if the thickness of the material is too thin) and for reducing the likelihood of tool failure (e.g. if the thickness of the material is too thick). In exemplary embodiments, the chip thickness is controlled to induce fracture of the removed material as it begins to form a coil.

In exemplary embodiments, the control system is programmed to control the feed rate during cutting operations. The term feed rate will be understood by those skilled in the art to mean the rate at which the tool is fed, i.e. advanced against the workpiece—often expressed as mm/revolution.

In exemplary embodiments, the cutting tool is programmed to move along a known path of curvature as the tool rolls into cut, during which time the feed rate is programmed to vary, in order to control the chip thickness as the tool rolls into cut along said known path of curvature.

In exemplary embodiments, the feed rate as the tool rolls into cut is programmed to vary in relation to an arc of engagement between a cutting surface of the cutting tool and the workpiece. In exemplary embodiments, the feed rate for a first arc of engagement is greater than the feed rate for a second arc of engagement, if the second arc of engagement is greater than the first arc of engagement. The feed rate for a third arc of engagement will be less than the feed rate for the second arc of engagement, if the third arc of engagement is greater than the second arc of engagement (but greater, if the third arc of engagement is less than the second arc of engagement).

In exemplary embodiments, a constant feed rate is used for the linear cutting operation. Typically, the constant feed rate will be optimal (with respect to the type of tool and the type of material) during the linear cutting operation. In most cases, the optimal feed rate will be higher than the feed rate as the tool rolls into cut.

However, in exemplary embodiments, the feed rate as the tool rolls into cut will still be a high rate (e.g. in the range of two to three times higher than conventional feed rates for movement into cut).

In exemplary embodiments, the cutting cycle is programmed to remove stock from a predefined area of the workpiece, wherein, for a first pass of the cutting cycle, the tool is moved into cut at a first position on the workpiece (e.g. on one side of the predefined area) and, for the following pass of the cycle, the tool is moved into cut at a second position on the work piece, wherein the second position is remote from the first position (e.g. on the opposite side of the predefined area).

Most preferably, the tool is moved out of cut on the first pass at a location intermediate said first and second positions. Withdrawing the tool between the two 'into cut' positions makes it possible to move out of cut at a fast feed rate, e.g. 100% of the normal feed rate, without concern for the boundary of the predefined area in the direction of which the tool is moving for each pass. Hence, for preferred embodiments, the first pass does not cut right across the predefined area. Instead, the tool is retracted well before it reaches the other side of the predefined area. In preferred embodiments, the tool is moved out of cut on the first pass at a location in the region of 25% to 75% of the distance between said first and second positions, e.g. at a mid point between the first and second positions. This ensures even wear on the respective parts of the cutting tool and reduces the overall process time.

In exemplary embodiments, movement out of cut is controlled to follow a radius or line of curvature (a process referred to as 'rolling out of cut'). This also reduces shock to the tool head and reduces work hardening of the workpiece at the point of withdrawal.

However, in other embodiments, the tool is moved out of cut abruptly, e.g. withdrawn in a linear direction immediately away from the workpiece. This may result in a sharp step being formed in the exposed surface of the workpiece. Accordingly, in exemplary embodiments in which the tool is withdrawn abruptly at the end of the first pass (e.g. in a direction substantially orthogonal to the direction of linear movement in cut during the first pass), movement of the tool on the second pass is controlled, in order to prevent or minimise the risk of coil generation as the tool cuts through and removes the material left at the end of the first pass.

In exemplary embodiments, the feed rate on the second pass is programmed to vary, e.g. in relation to an arc of engagement between a cutting surface of the cutting tool and the workpiece as the tool passes through the material left at the end of the first pass. In exemplary embodiments, the feed rate on the second pass increases in relation to a decreases in the arc of engagement between the tool and the material left at the end of the first pass.

There is also provided a control system for a machining apparatus, wherein the control system is programmed for controlling movement of a cutting tool to remove stock from a turning workpiece, in accordance with the method of the above aspect of the invention.

There is also provided a computer program for controlling movement of a cutting tool to remove stock from a turning workpiece, in accordance with the method of the above aspect of the invention.

There is further provided a gas turbine component produced using a method in accordance with the above aspect of the invention, and a method of producing a gas turbine component in accordance with the steps of the method of the above aspect of the invention.

Other aspects and features of the invention will be readily apparent from the claims and the following description of preferred embodiments, made by way of example only, with reference to the accompanying drawings, in which:

FIGS. 1 to 11 are provided for the purpose of describing an improved method of machining a workpiece, in particular a turning operation.

In general terms, a workpiece 10 is rotated and a cutting tool 12 is moved into contact with the rotating workpiece 10, in order to cut stock from said workpiece 10, e.g. to form a recess, groove or other formation in the workpiece 10.

As described in more detail below, the method involves a cutting cycle in which the tool 12 is moved in a first direction relative to the workpiece 10 (referred to as the first 'pass' of the cutting tool), in order for a cutting head 20 of the cutting tool 12 to cut a first portion of stock from the workpiece 10. The tool 12 is then moved in a second direction relative to the workpiece 10 (referred to as the second 'pass' of the cutting tool), in order to cut a second portion of stock from the workpiece. The cycle is repeated as desired, so that stock is progressively removed from the workpiece 10, e.g. by successive passes of the cutting tool 12.

Figure 11:
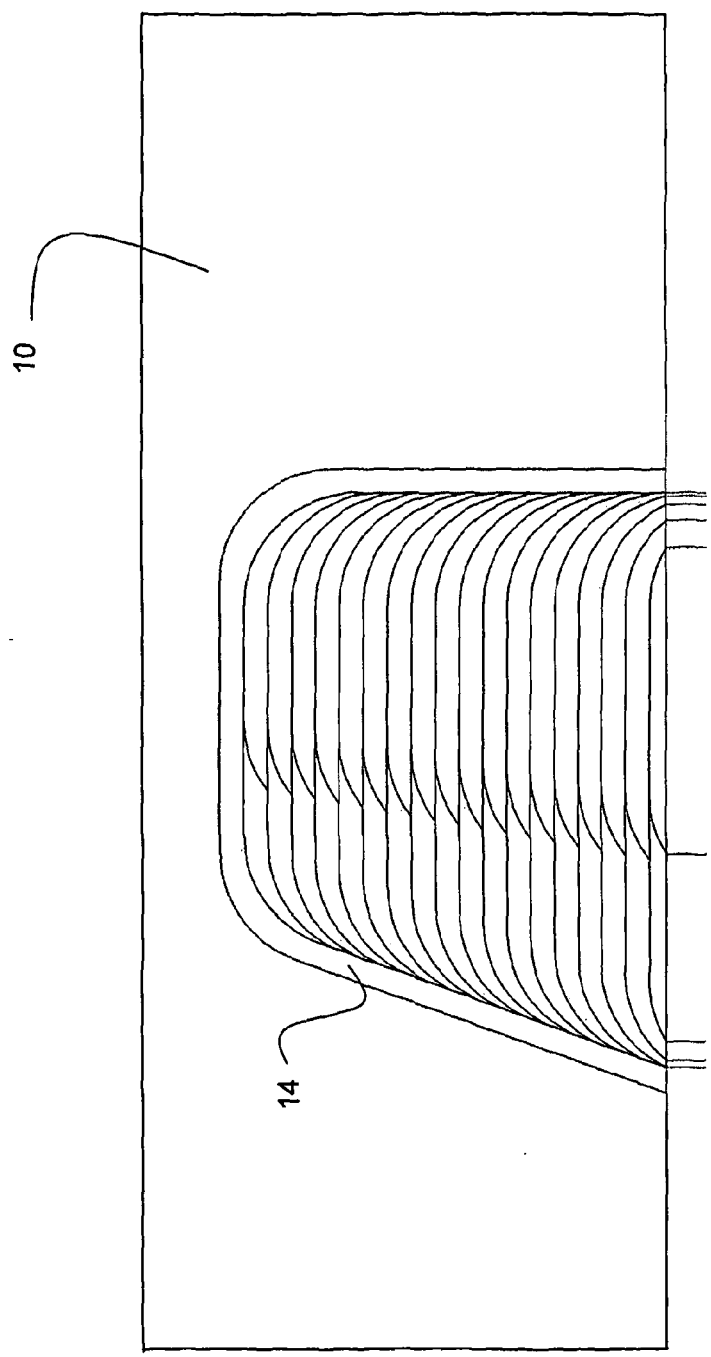
FIG. 11 is a schematic illustration showing how the cutting cycle of FIGS. 1 to 10 is used to progressively remove stock from a predefined portion of the work piece.

In exemplary embodiments, the method is used for a roughing operation (i.e. as opposed to a finishing operation), for removing a significant portion of stock 14 from a desired location on the workpiece 10 (e.g. a virgin surface on the workpiece 10), as indicated in FIG. 11.

The method is automated, wherein an electronic control system is programmed to control movement of the cutting tool 12 relative to the workpiece 10 during cutting cycles, in order to produce a predefined feature or formation at a predefined location on the workpiece 10.

FIGS. 1 to 5 are illustrative of an example of a first pass of the tool 12 relative to the workpiece 10.

Figure 1:
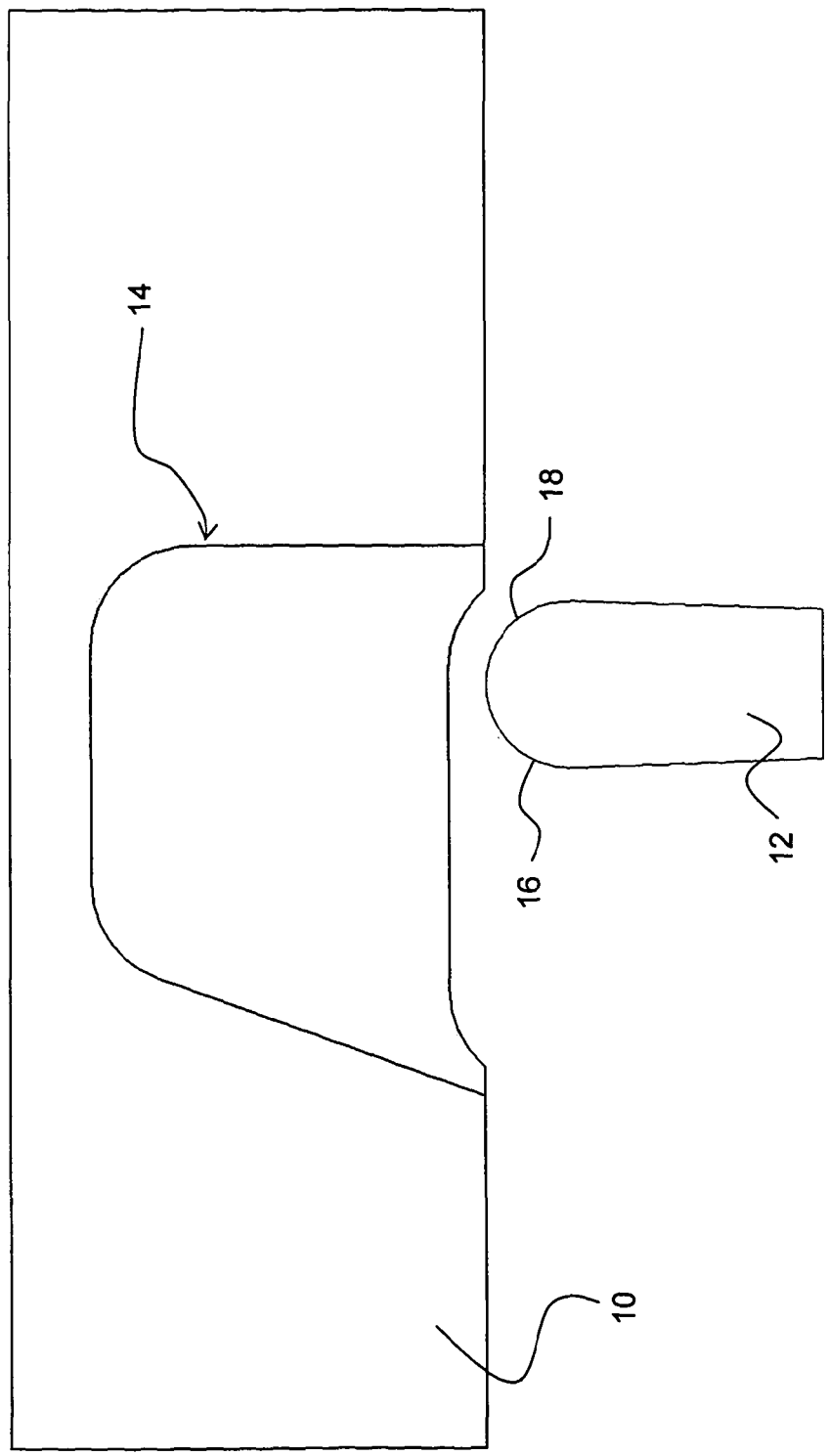
FIGS. 1 to 5 are schematic illustrations showing an example of movement of a cutting tool in a first direction relative to a workpiece, in order to affect a first pass or cut into the workpiece.
Figure 2:
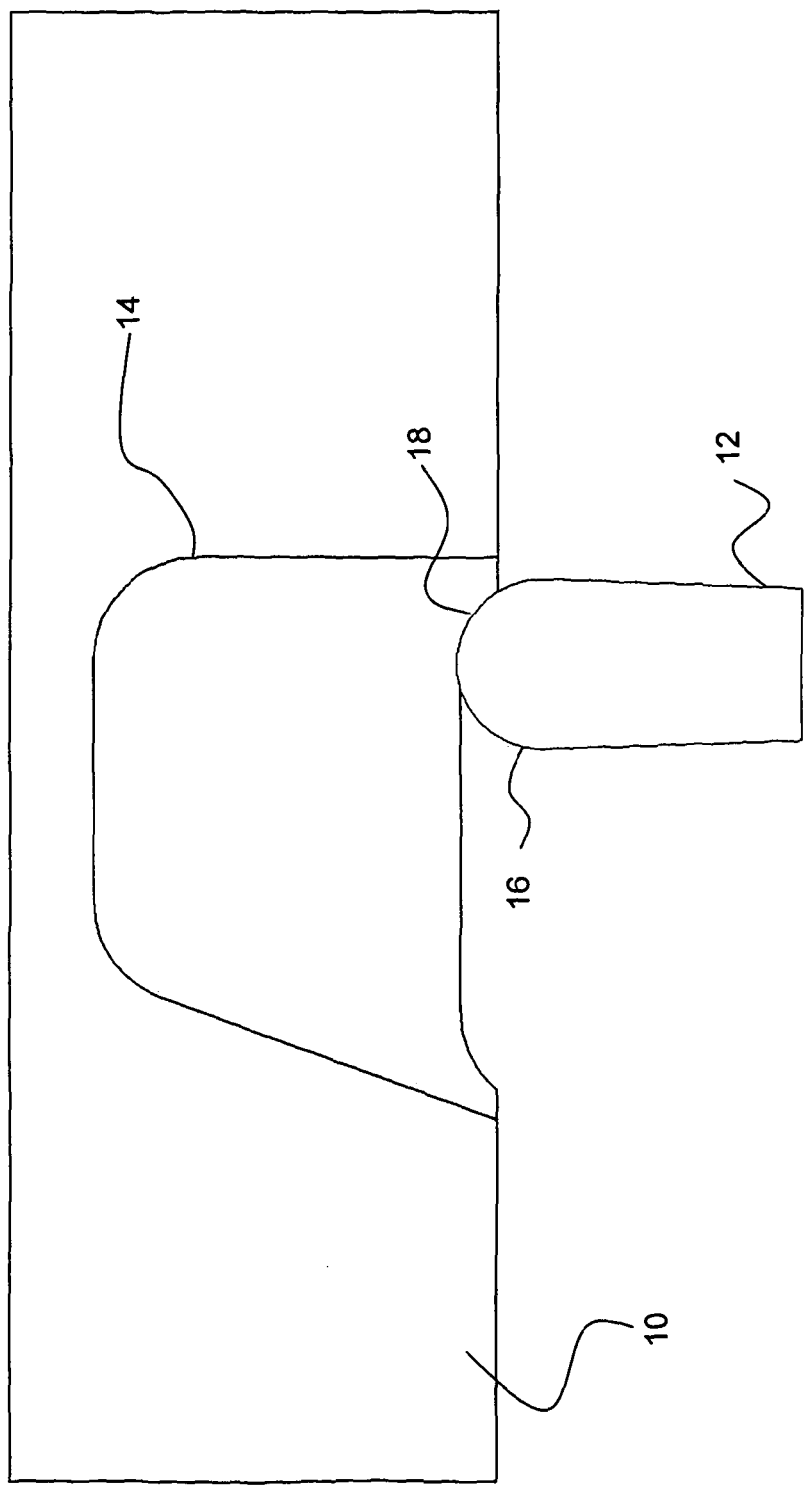
Figure 3:
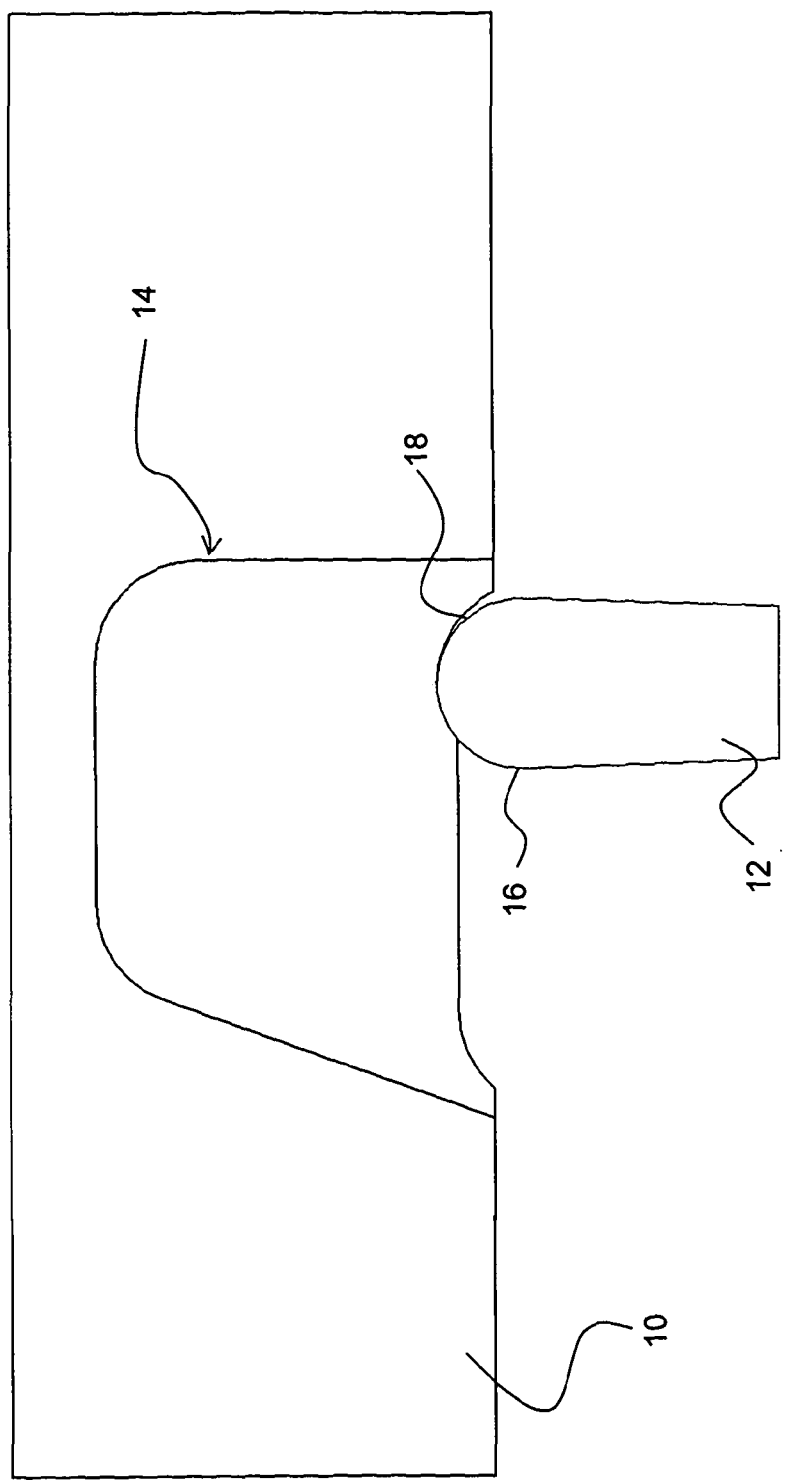
Figure 4:
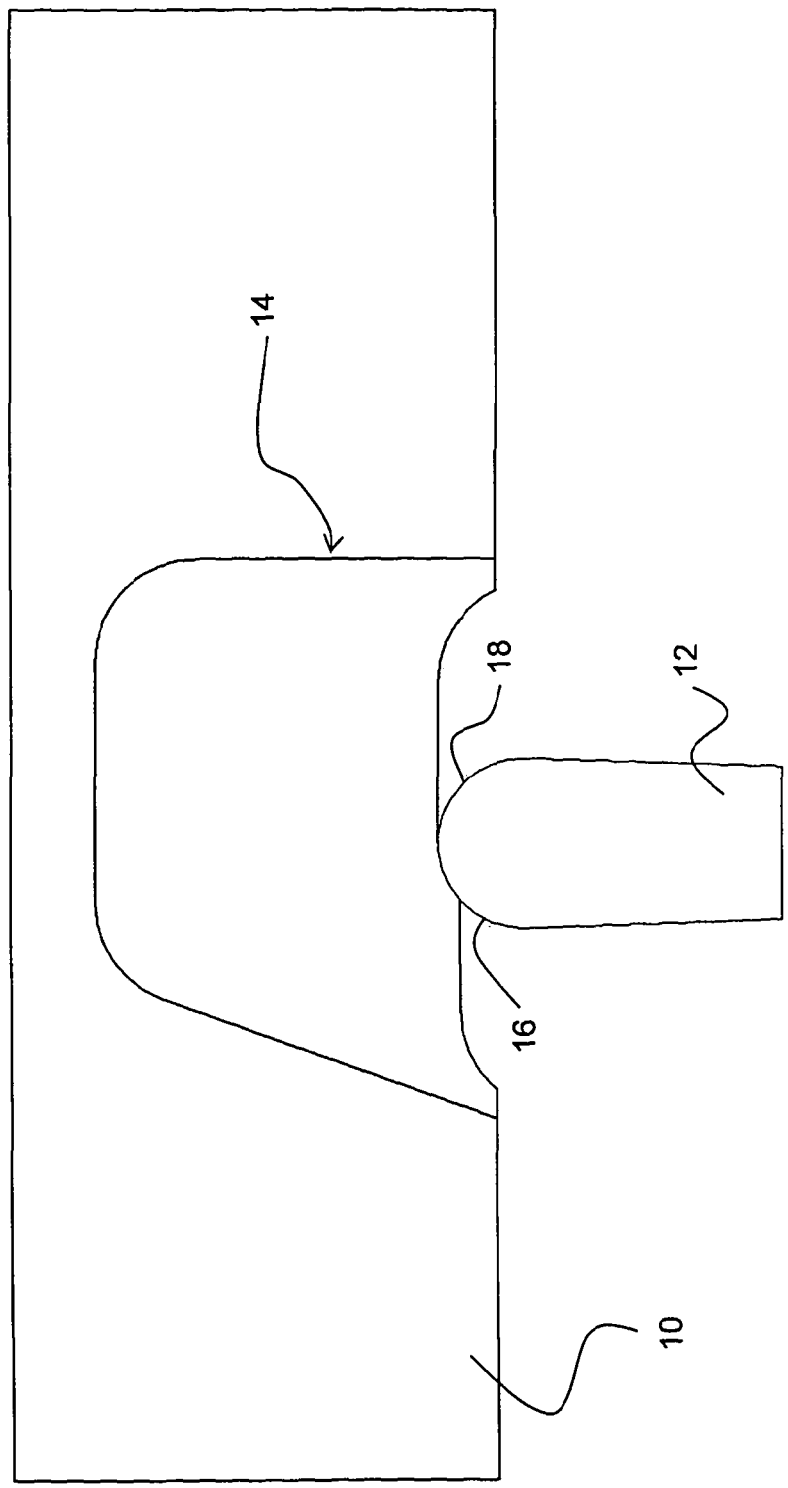
Figure 5:
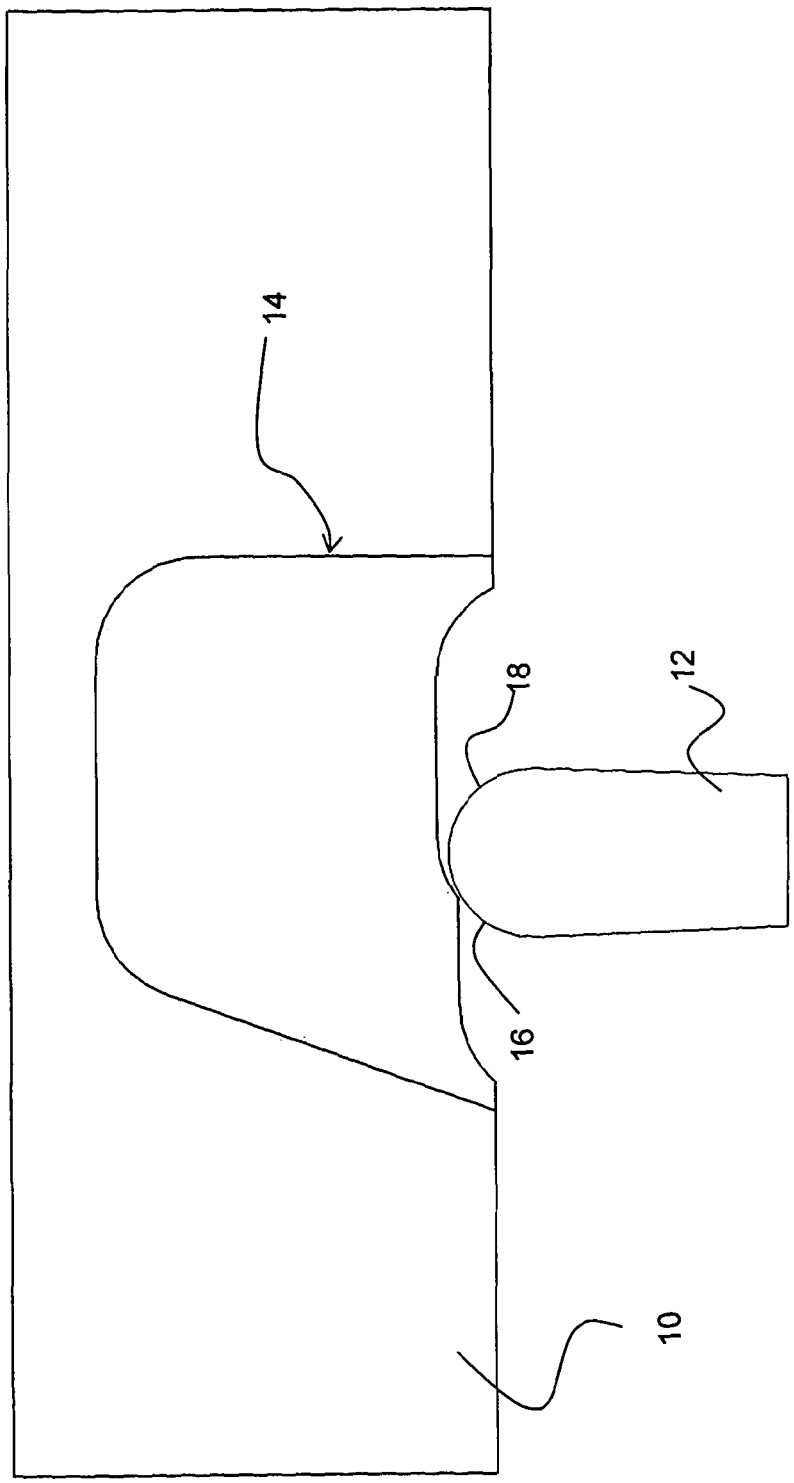
Figure 6:
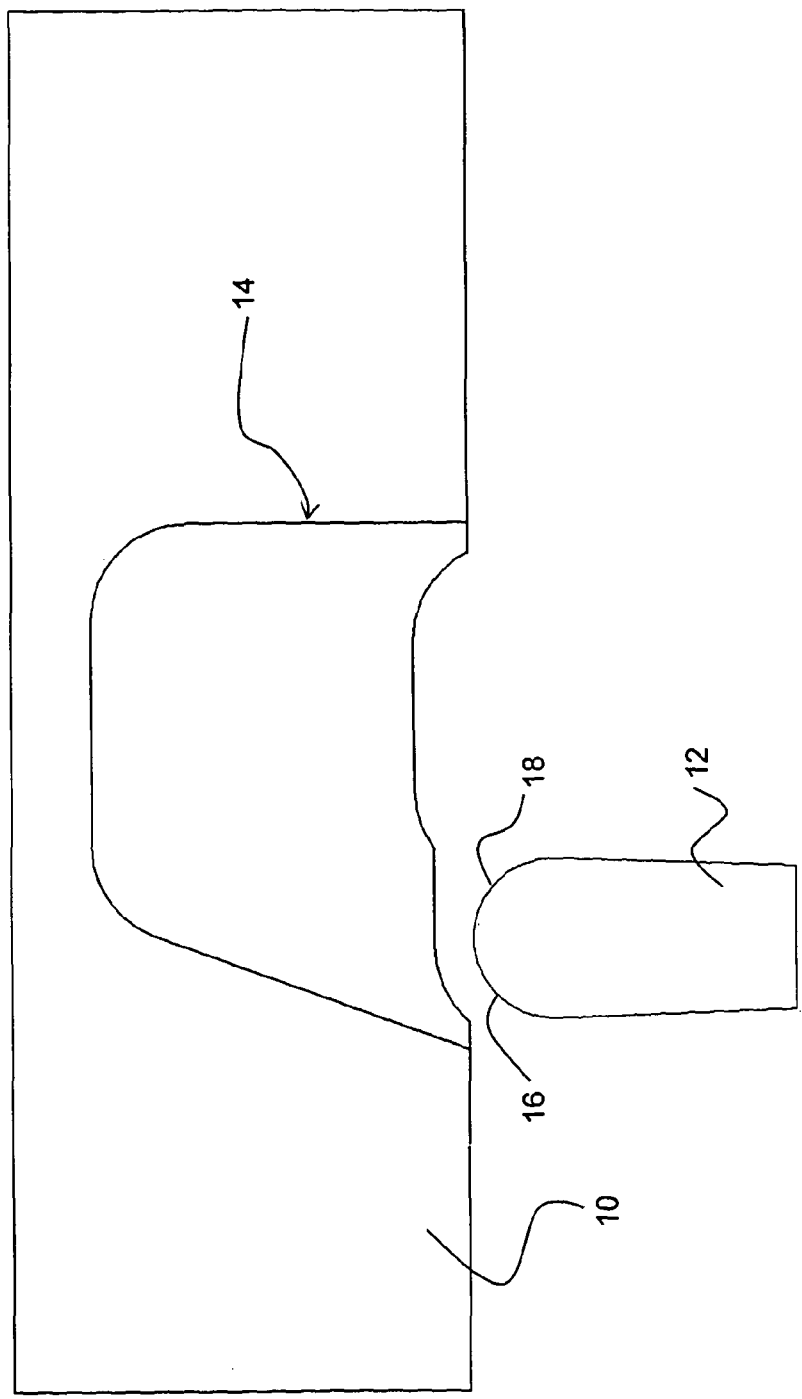
FIGS. 6 to 10 are similar to FIGS. 1 to 5 but showing movement of the cutting tool in a second direction (generally opposite to that shown in FIGS. 1 to 5), in order to affect a reverse pass or cut into the workpiece.
Figure 7:
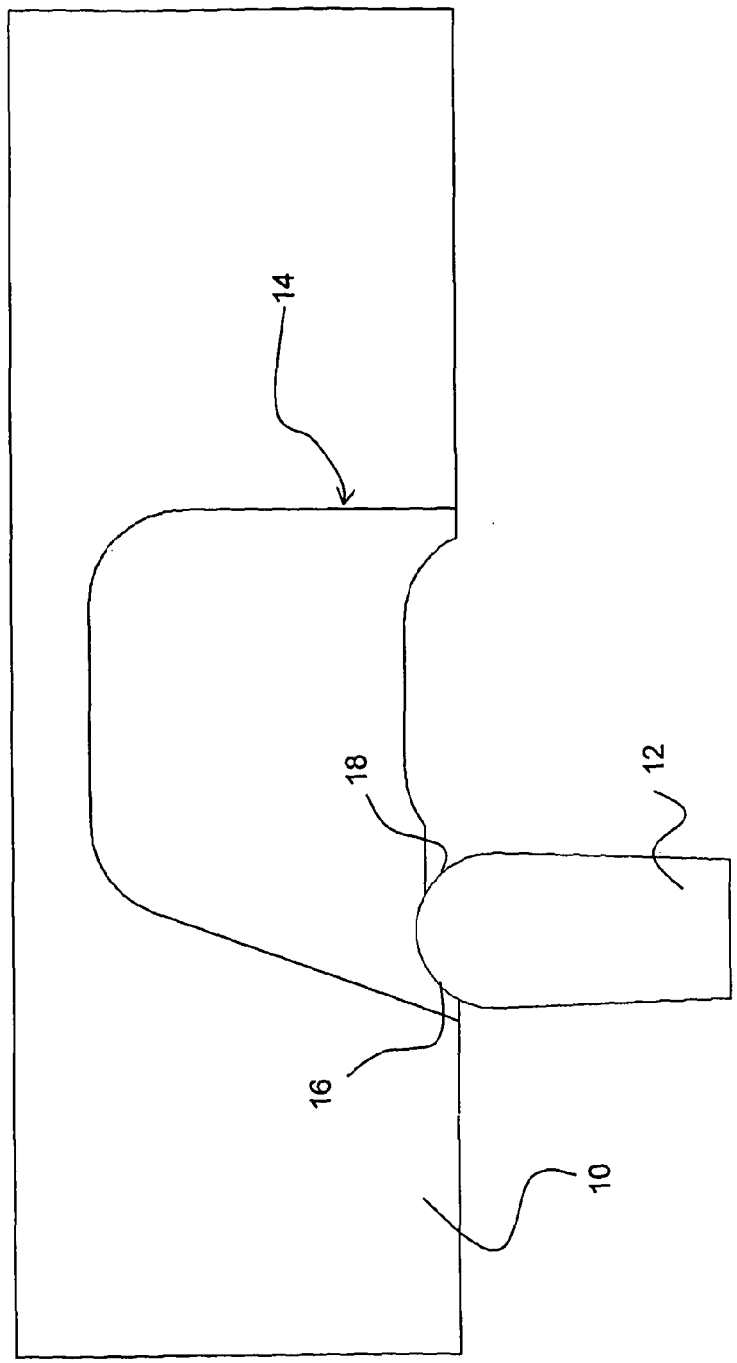
Figure 8:
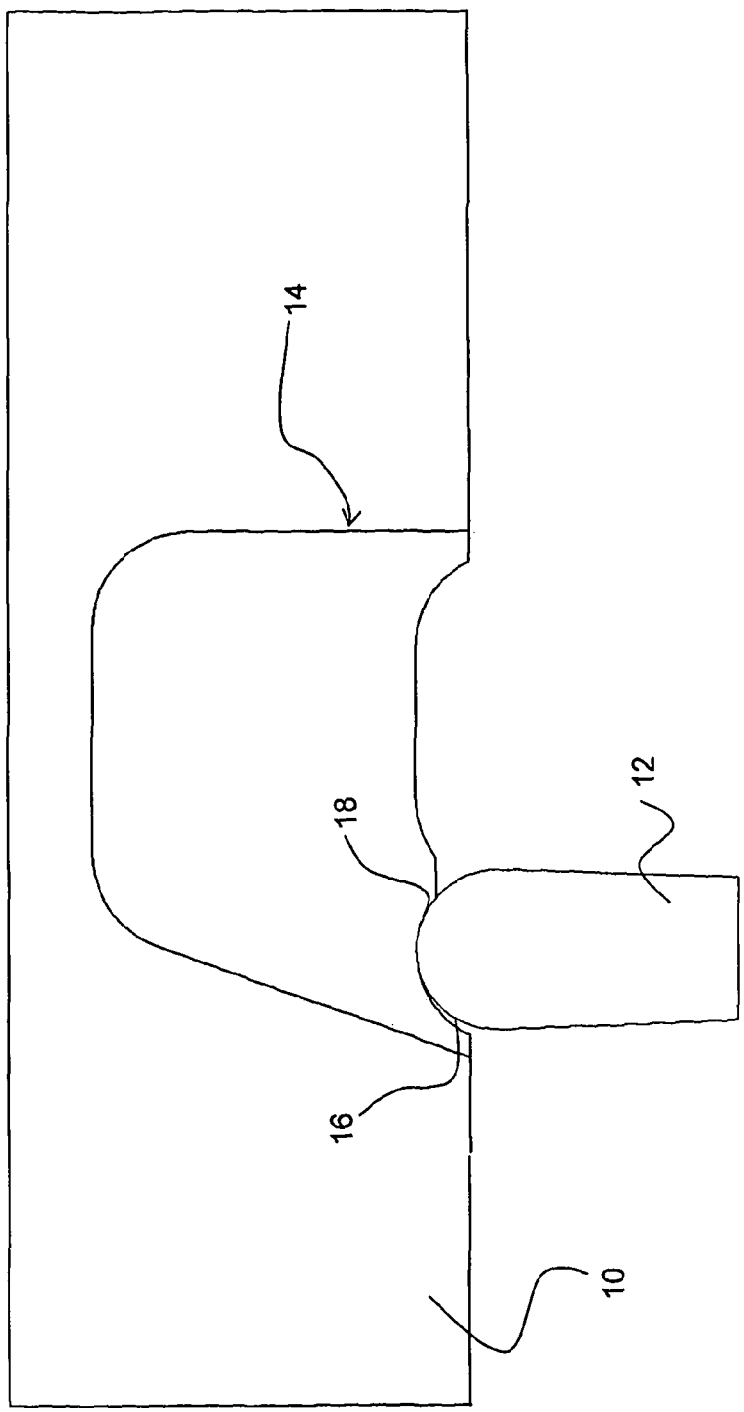
Figure 9:
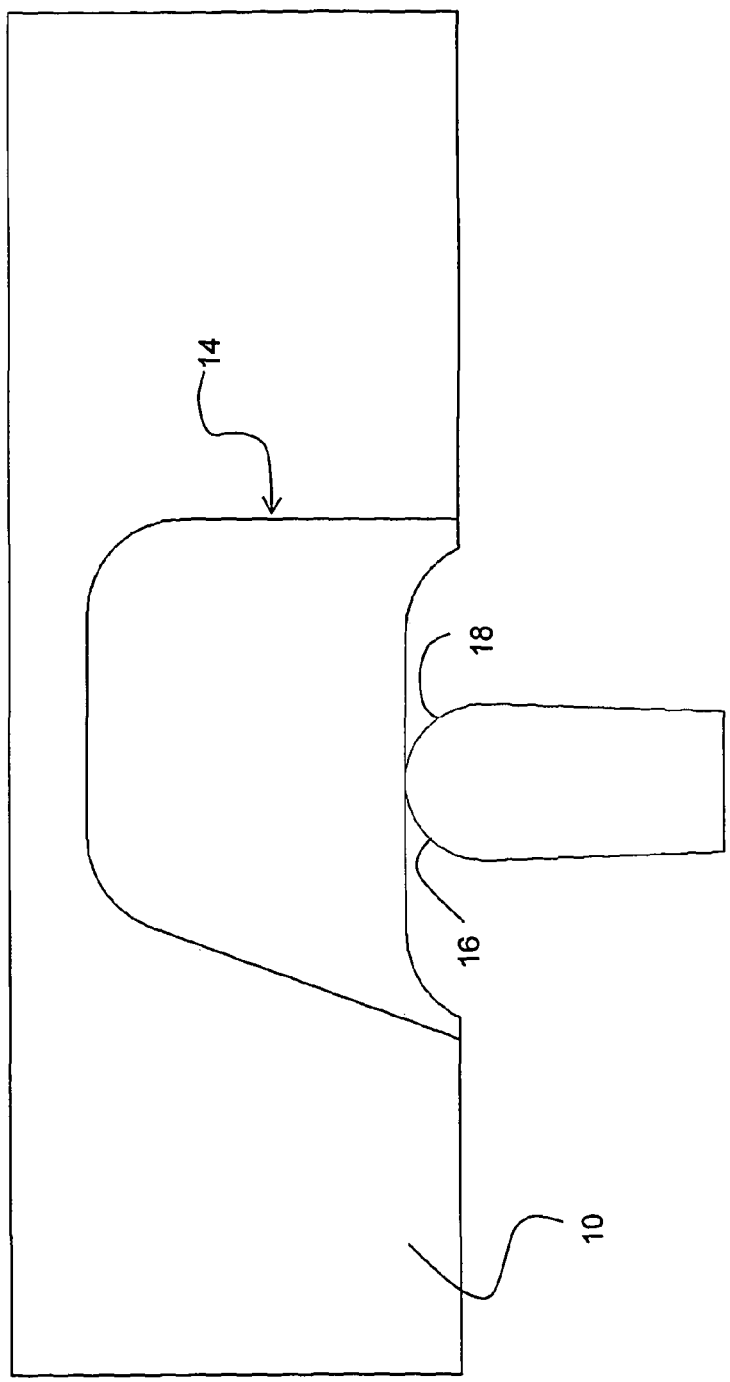
Figure 10:
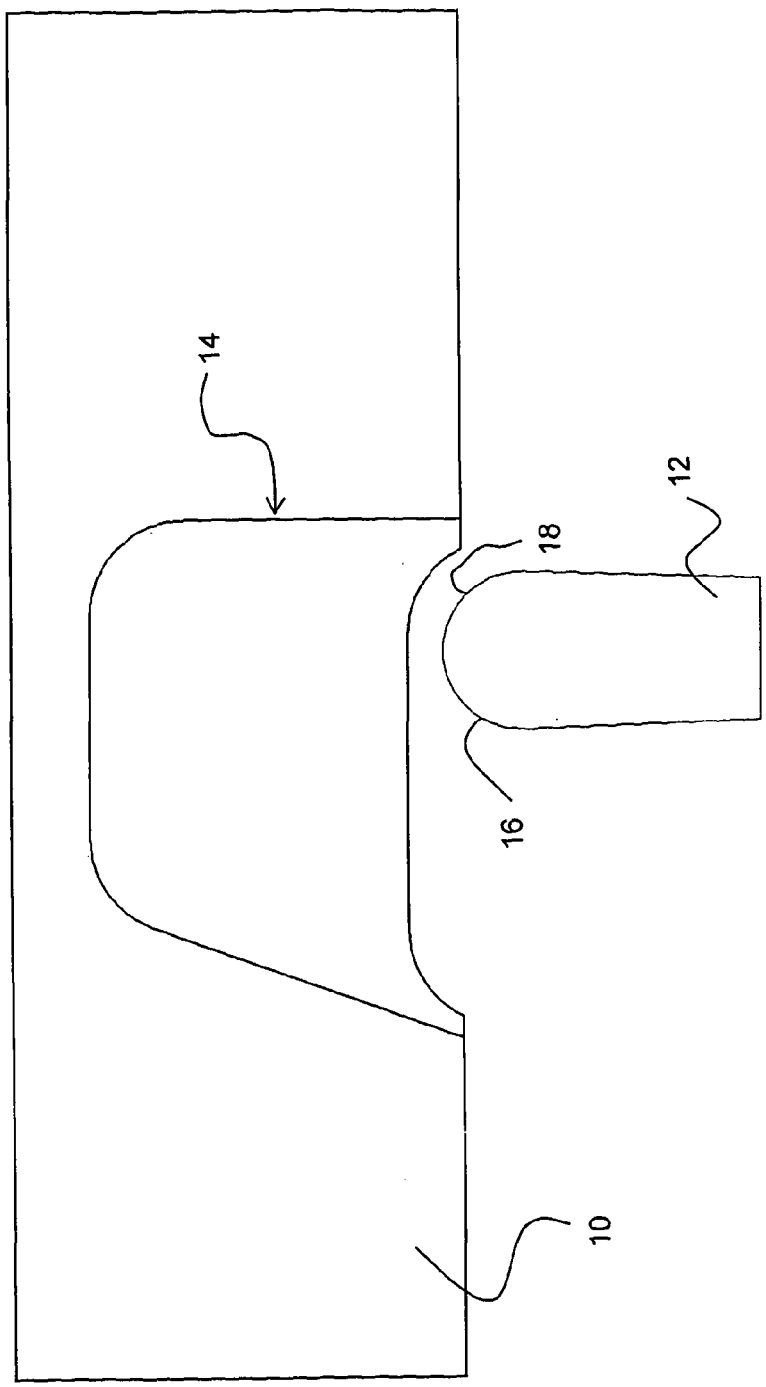

In FIG. 1, the tool 12 is at rest and is ready to be moved to engage the stock (see FIG. 2). In this embodiment, this first movement is in a generally axial direction with respect to the axis of rotation of the workpiece (upwards as shown in FIGS. 1 to 5). During the initial engagement between the tool 12 and the workpiece 10, the tool 12 is controlled to follow a path of curvature as the cutting head 20 cuts into the stock (see FIG. 3), in a process sometimes referred to as 'rolling into cut'. The tool 12 is then moved laterally so that the cutting head 20 makes a cut along a portion of the stock (see FIG. 4), a process sometimes referred to as 'moving in cut', before withdrawal of the tool 12 from the stock (see FIG. 5), sometimes referred to as 'moving out of cut'.

FIGS. 6 to 10 are illustrative of a second or 'reverse' pass of the tool 12 relative to the workpiece 10. Initially, the tool 12 is at rest after withdrawal from the workpiece 10 at the end of the first pass (see FIG. 6), and is then moved into cut in the same manner as the first pass but in an opposite direction to the first pass (see FIG. 7). Hence, the tool 12 is rolled into cut (FIG. 8), then moved laterally (FIG. 9) to make another cut along a portion of the stock, prior to withdrawal of the tool from the workpiece (see FIG. 10).

As can be seen, the second pass is made in a direction which is opposite or substantially opposite to the direction of the first pass. Alternating the direction of each pass of the tool 12 significantly reduces the likelihood of the coil generation (often referred to as 'wrap around'). Hence, the risk of surface abrasion of the turning workpiece 10 as a result of swarf contact is greatly reduced, when compared with conventional turning techniques.

As can be seen from a comparison of FIGS. 3 and 4 or FIGS. 8 and 9, the movement of the tool 12 in cut is linear (e.g. the cutting head 20 follows a straight path). In exemplary embodiments, the movement of the tool 12 in cut is at high feed rate, e.g. 100% of the optimal feed rate.

Each pass of the tool removes a predefined depth of cut from the stock. In the illustrated embodiment, same depth of cut is achieved with each pass. In other embodiments, the second pass may be controlled to cut to a different depth (e.g. a greater depth) than the first pass (and so on). However, in each embodiment, it is desirable for the feature to be produced using multiple cutting cycles, in which each pass removes a thin section of material from the stock, so that the feature is formed progressively (e.g. as shown in FIG. 11). This reduces tool loading.

In the illustrated embodiment, the cutting head 20 has first and second cutting surfaces 16, 18 which are used alternately, i.e. so that the first cutting surface 16 is used for a first and third pass and the second cutting surface 18 is used for a second and fourth pass, etc. This greatly improves the longevity of the tool.

In the illustrated embodiment, the cutting head 20 of the cutting tool 12 is rounded, and presents first and second cutting surfaces 16, 18 of the same constant radius. In particular, the cutting tool 12 has a curved cutting surface 16, 18 of constant radius, wherein a first part/arc of the cutting surface 16, 18 is used for the first pass and a second part/arc (e.g. opposite the first part) is used for the second pass. In this embodiment, the tool 12 has a generally hemispherical cutting head 20.

As can be seen from a comparison of FIGS. 1 to 5 and 6 to 10, for a first pass of the cutting cycle, the tool 12 is moved into cut at a first position on the workpiece 10 (e.g. on one side of the predefined area 14), and for the following pass of the cutting cycle, the tool 12 is moved into cut at a second position on the work piece 10, remote from the first position (e.g. on the opposite side of the predefined area 14).

Advantageously, the tool 12 is moved out of cut on the first pass at a location intermediate said first and second positions, e.g. at a location in the region of 25% to 75% of the distance between said first and second positions, such as at a mid point between the first and second positions. Withdrawing the tool 12 between the two 'into cut' positions makes it possible to move out of cut at a fast feed rate, e.g. 100% of the normal feed rate, without concern for the boundary of the predefined area 14 in the direction of which the tool is moving in the respective pass. As such, for preferred embodiments, the first pass does not cut right across the predefined area 14. Instead, the tool 12 is retracted on its first pass well before it reaches the other side of the predefined area 14.

The movement of the tool 12 out of cut may be at a higher feed rate than during movement of the tool 12 into cut, e.g. 100% of the optimal feed rate. This reduces the overall process time.

Figure 27:
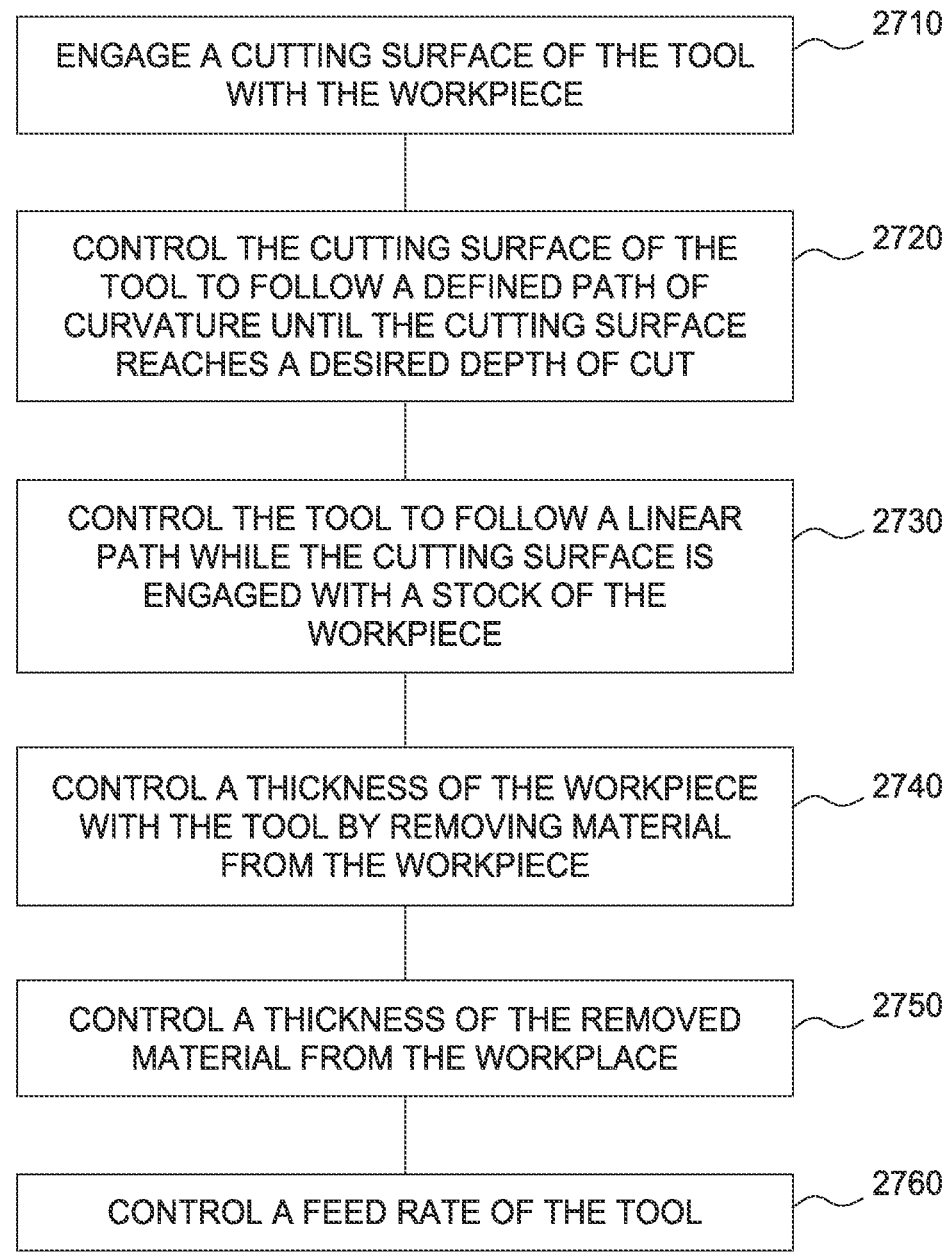
FIG. 27 is a schematic illustration of operations of a method for controlling movement of a cutting tool to remove stock from a turning workpiece.

Advantageously, the control system may be programmed so that, for the first pass, the tool is brought into engagement with the workpiece and is controlled to follow a defined path of curvature (e.g. following a known radius) as it rolls into cut, as shown at operation 2710 of FIG. 27. Hence, the cutting surface 16 of the tool is programmed to follow a controlled path until the cutting surface 16 reaches a desired depth of cut within the predefined area 14 (i.e. ready for the linear cutting operation), as shown at operation 2720 of FIG. 27. The cutting tool 12 is then controlled to follow a straight/linear path (in cut'), wherein the cutting surface 16 of the tool is engaged with the stock and moves along at said predetermined depth of cut, as shown at operation 2730 of FIG. 27.

Advantageously, the control system may be programmed for controlling the thickness of the material which is removed from the workpiece 10 as the tool 12 rolls into cut (i.e. until the tool reaches the required depth of cut or start point for the linear cutting operation of the same pass), in order to reduce the likelihood of coil generation and to reduces temperature loading on the tool (thereby further improving the longevity of the tool), as shown at operation 27401 of FIG. 27.

In exemplary embodiments, the thickness of the material which is being cut from the workpiece 10 (often referred to as the 'chip thickness') is controlled to remain within a desired thickness range, in order to reduce the likelihood of coil generation (e.g. if the thickness is too thin) and to reduce the likelihood of tool failure (e.g. if the thickness is too thick), as shown at operation 2750 of FIG. 27. For particular materials, the envelope between 'too thin' and 'too thick' may be as little as 0.05 mm. It will be understood that such control cannot be achieved manually. For particular materials, it is possible to select a chip thickness which will induce fracture in the removed material as it begins to form a coil.

In exemplary embodiments, the control system is programmed to control the feed rate during the cutting cycle, in order to control chip thickness, as shown at operation 2760 of FIG. 27. In exemplary embodiments, the cutting tool 12 is programmed to follow a known path of curvature (e.g. a known radius) as the tool 12 rolls into cut, during which time the feed rate is programmed to vary, in order to control the chip thickness as the tool rolls into cut along said known path of curvature.

More particularly, the feed rate as the tool 12 rolls into cut may be programmed to vary in relation to an arc of engagement between a cutting surface 16, 18 of the cutting tool 12 and the workpiece 10.

An exemplary method will now be described in more detail with reference to FIGS. 12 to 26.

Each pass in the cutting cycle begins with the control system (indicated at 22 in FIG. 12 only) controlling movement of the cutting tool 12 in the direction of the workpiece 10, in order to bring the cutting head 20 into engagement with the stock. The tool 12 then moves relative to the workpiece, in order for the cutting head 20 to cut into the stock. More particularly, after the initial engagement of the stock, movement of the tool 12 is controlled to roll into cut, wherein the cutting head 20 follows a predetermined path of curvature in order to cut into the stock. The cutting head 20 follows the curved path until it reaches a predefined position at a predefined depth of cut. The cutting head 20 is then controlled to move in a linear direction with a cutting surface of the tool 12 engaged with the stock at said predefined depth of cut, prior to withdrawal of the cutting head 20 from the workpiece 10.

In FIGS. 12 to 26, the solid line of curvature 24 represents a surface which the control system 22 has been programmed to produce in the workpiece 10 using the cutting tool 12 in a cutting cycle in accordance with the invention, whereas the dotted line of curvature 26 represents an exposed surface on the workpiece that the cutting tool 12 has been programmed to cut into, e.g. a curved surface left behind by the cutting tool 12 as the result of a previous cutting cycle in accordance with the invention.

For ease of illustration, only part of the cutting head 20 of the cutting tool 12 is shown in FIGS. 12 to 26. More particularly, each of FIGS. 12 to 26 shows part of a sector of the cutting head 20, e.g. as defined by an arc of engagement 28 between the cutting head 20 and the workpiece 10. As will be seen from FIGS. 12 to 26, the length of the arc of engagement 28 is dependent upon the position of the tool 12 during its cutting movement relative to the workpiece 10.

Figure 12:
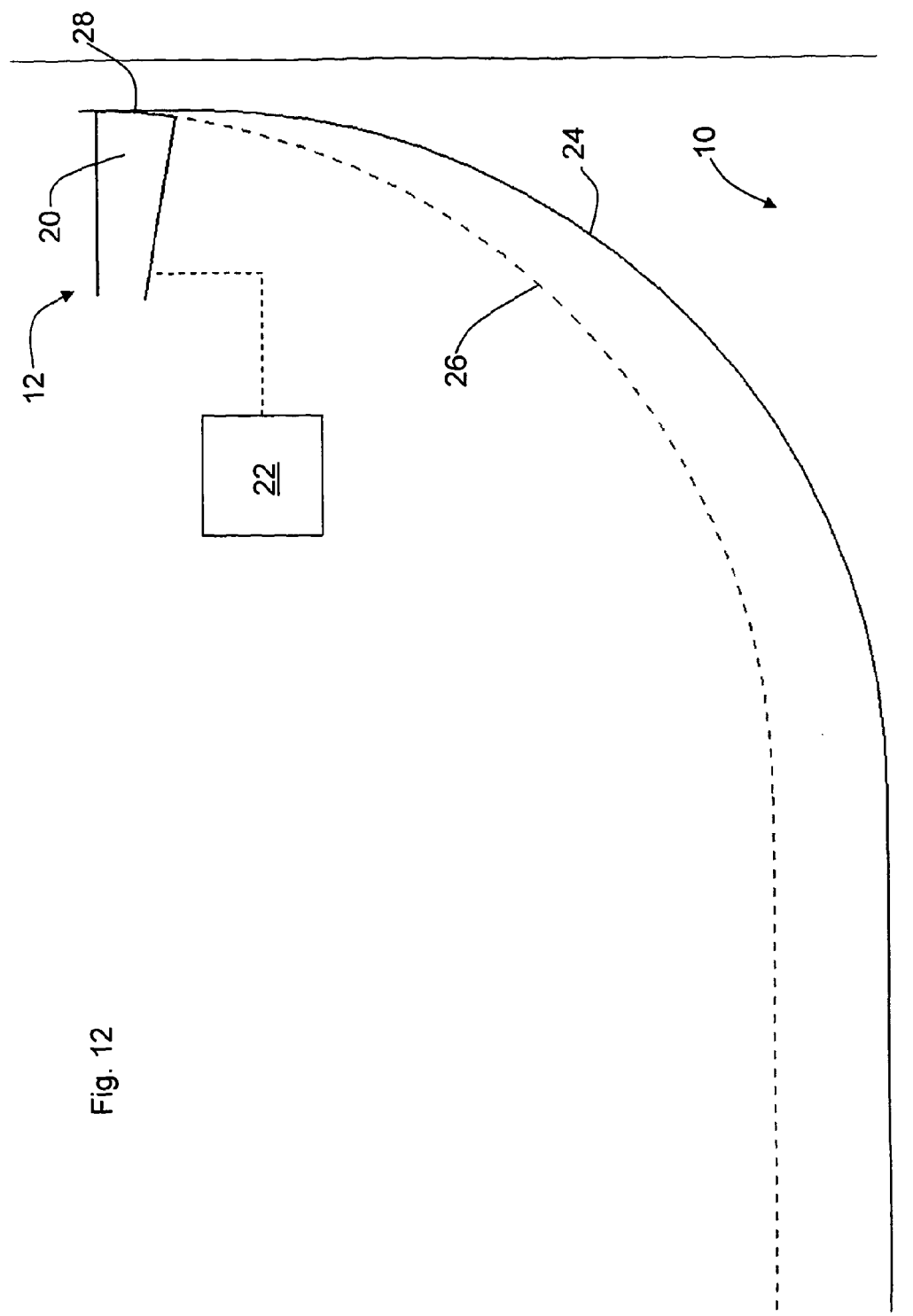
FIGS. 12 to 19 are schematic illustrations showing a change in arc of engagement between a cutting tool and a workpiece as the cutting tool rolls into cut.

FIG. 12 represents the position of the tool 12 at or immediately after an initial point of engagement with the workpiece 10, i.e. as the tool 12 begins to roll into cut in order to generate the programmed surface 24. The cutting head 20 has a curved cutting surface of constant radius and the arc of engagement 28 between the cutting surface and the workpiece extends from a tangential point of contact with the workpiece 10 to the last point of engagement with the exposed surface 26.

Figure 13:
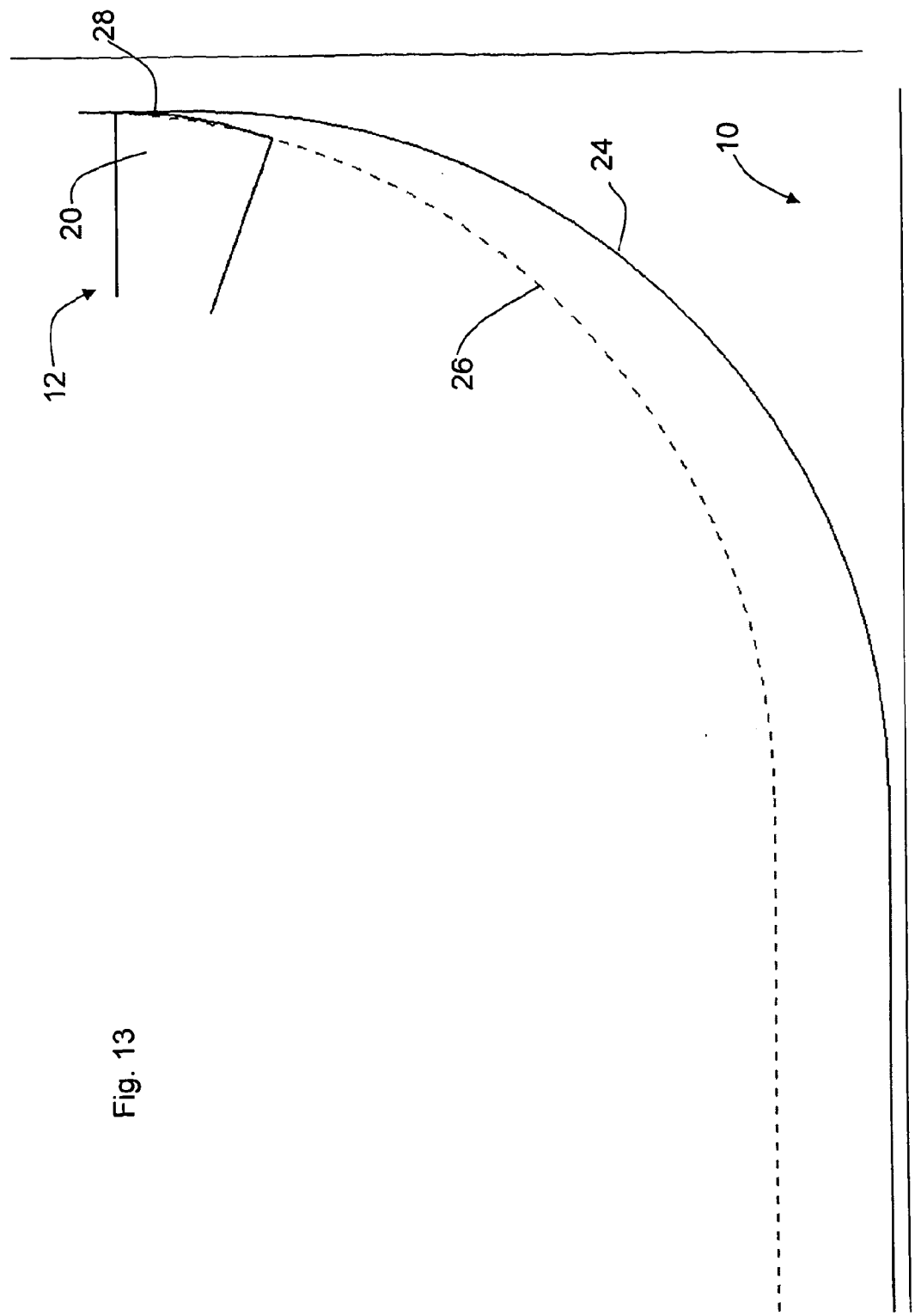
Figure 14:
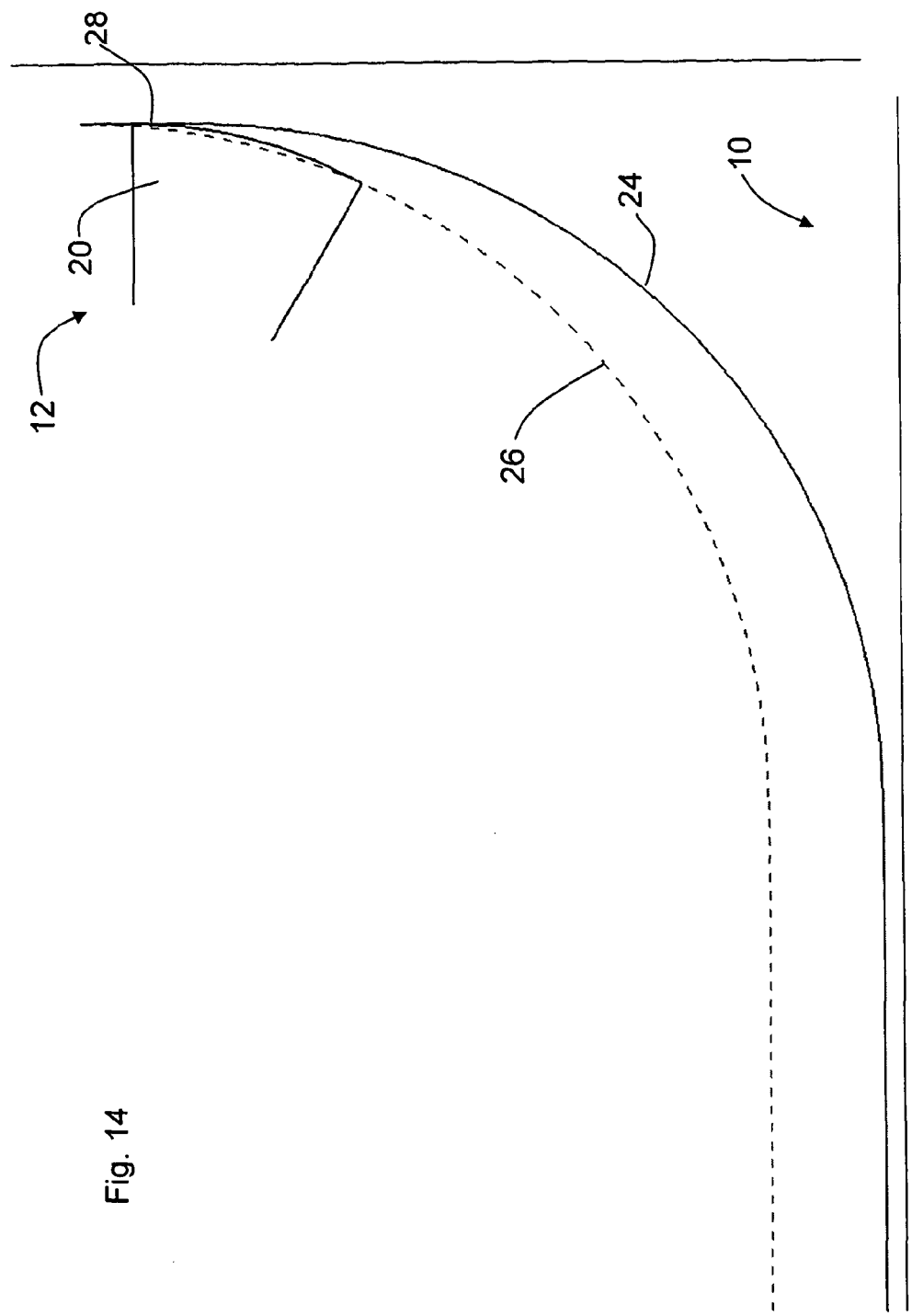
Figure 15:
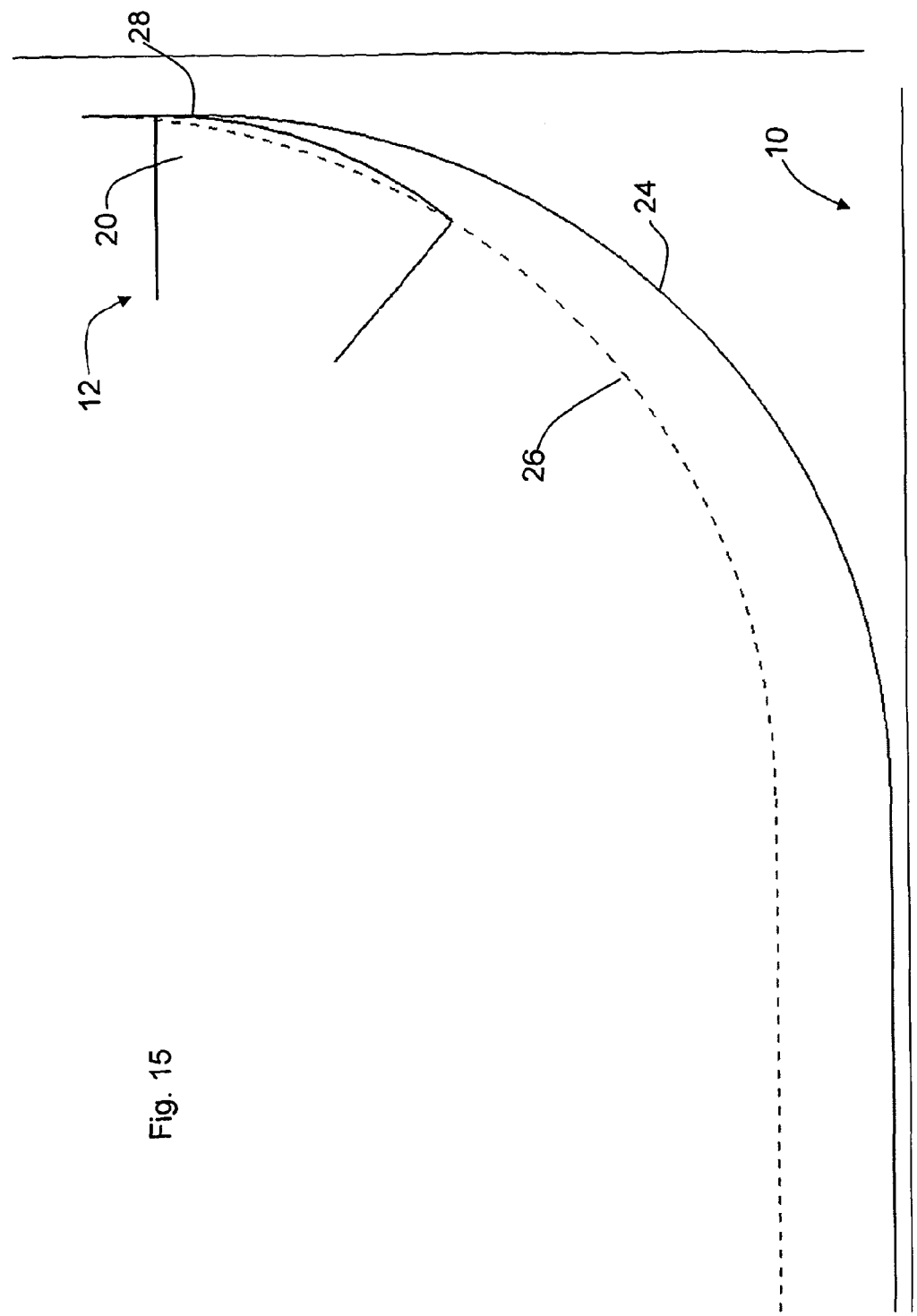
Figure 16:
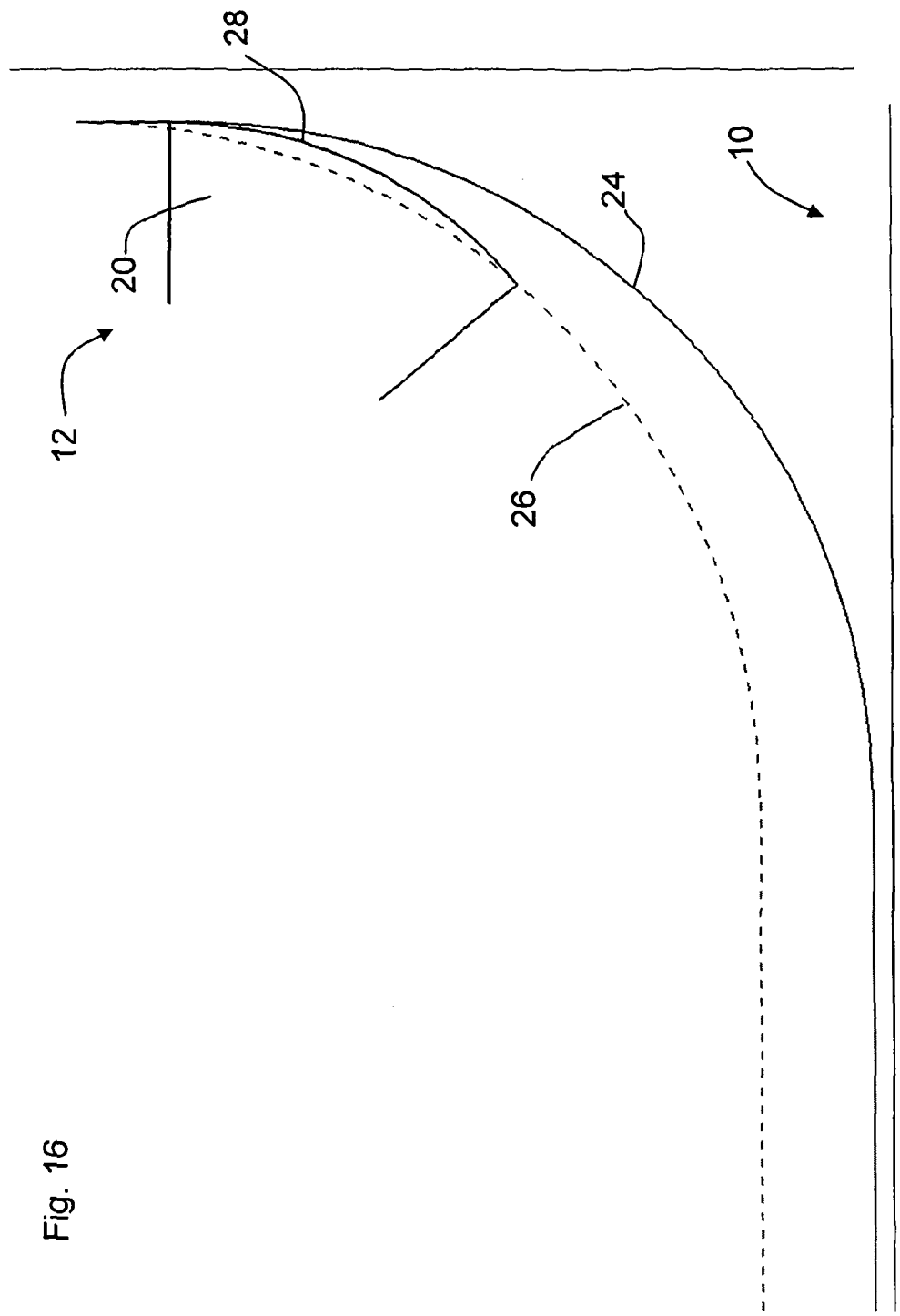
Figure 17:
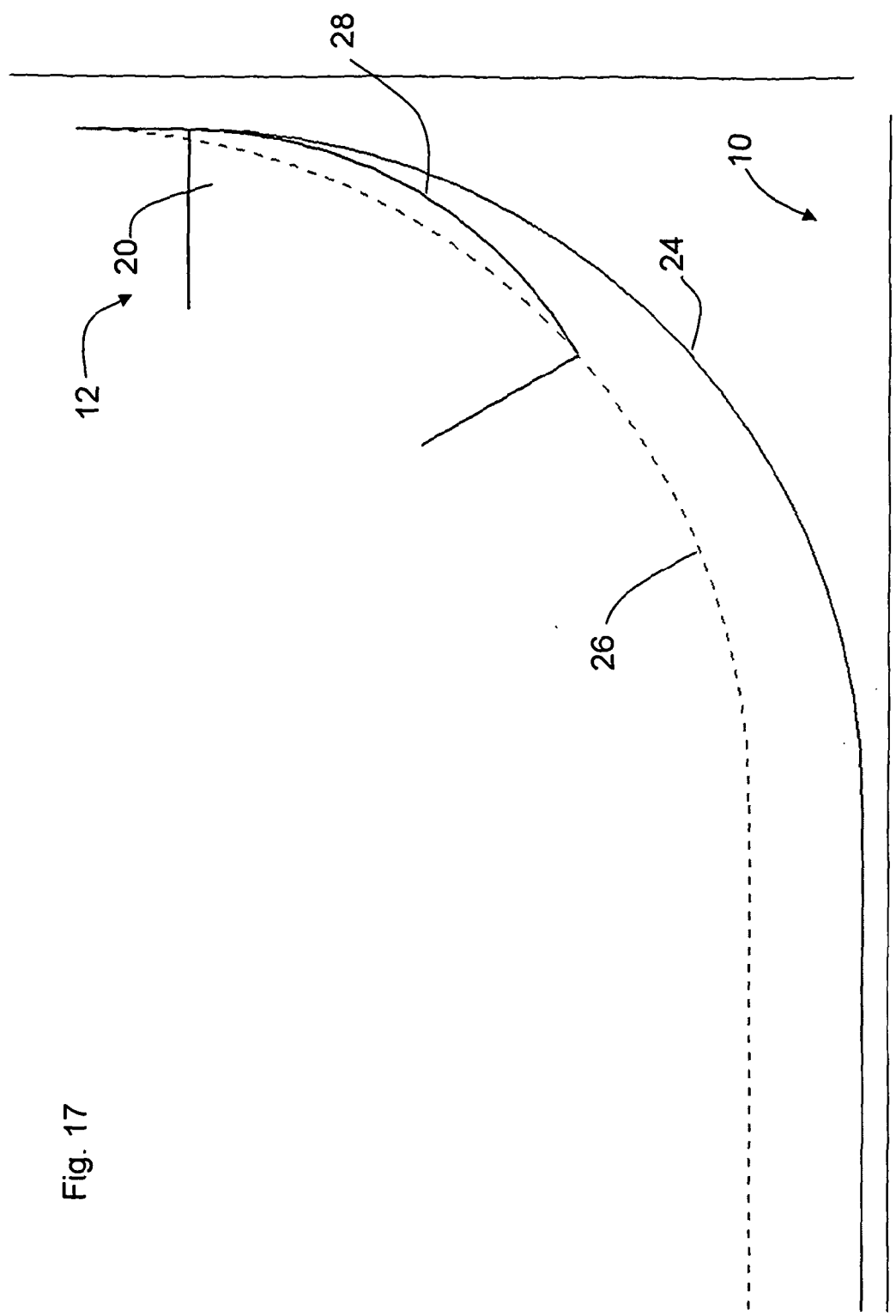
Figure 18:
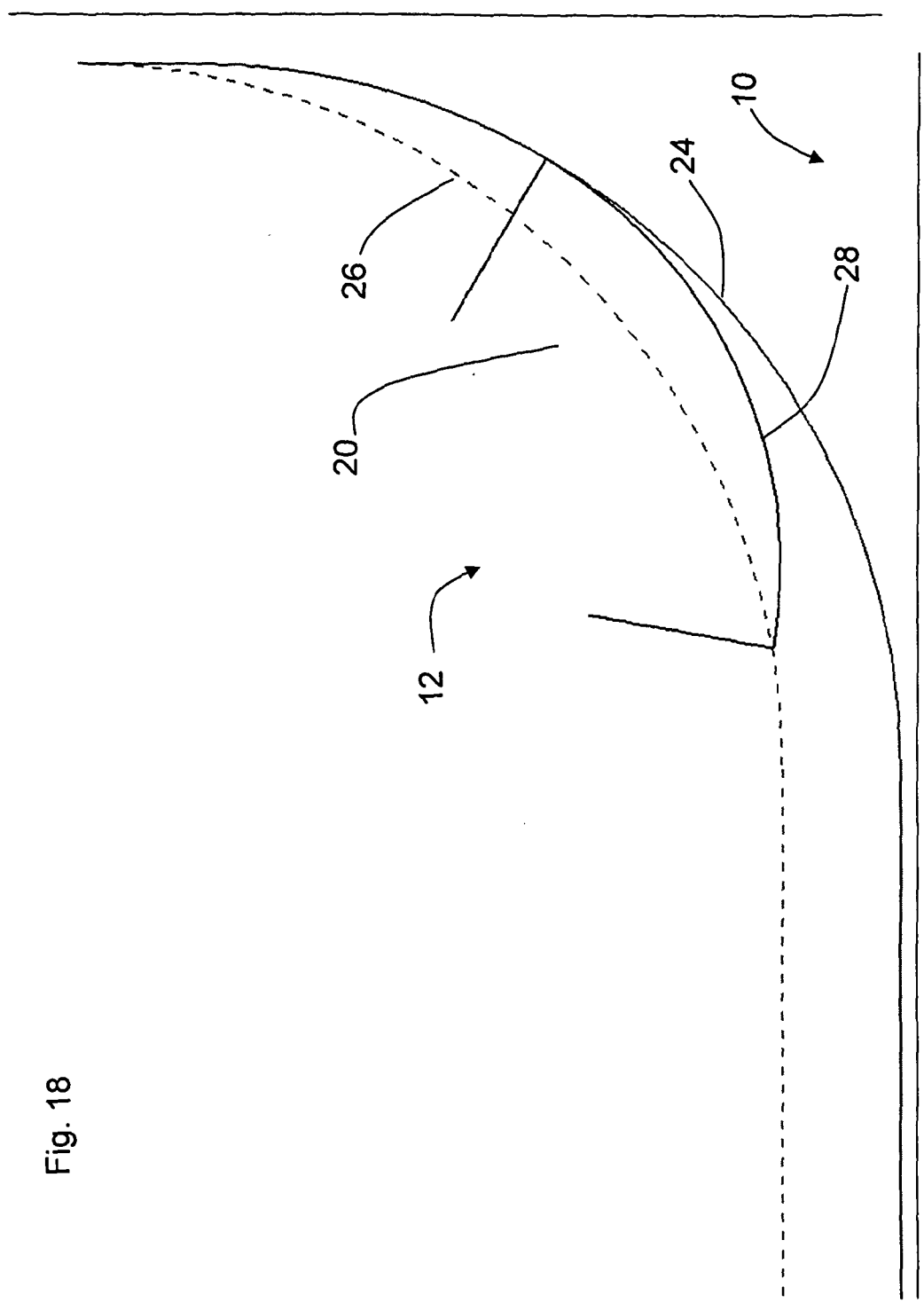
Figure 19:
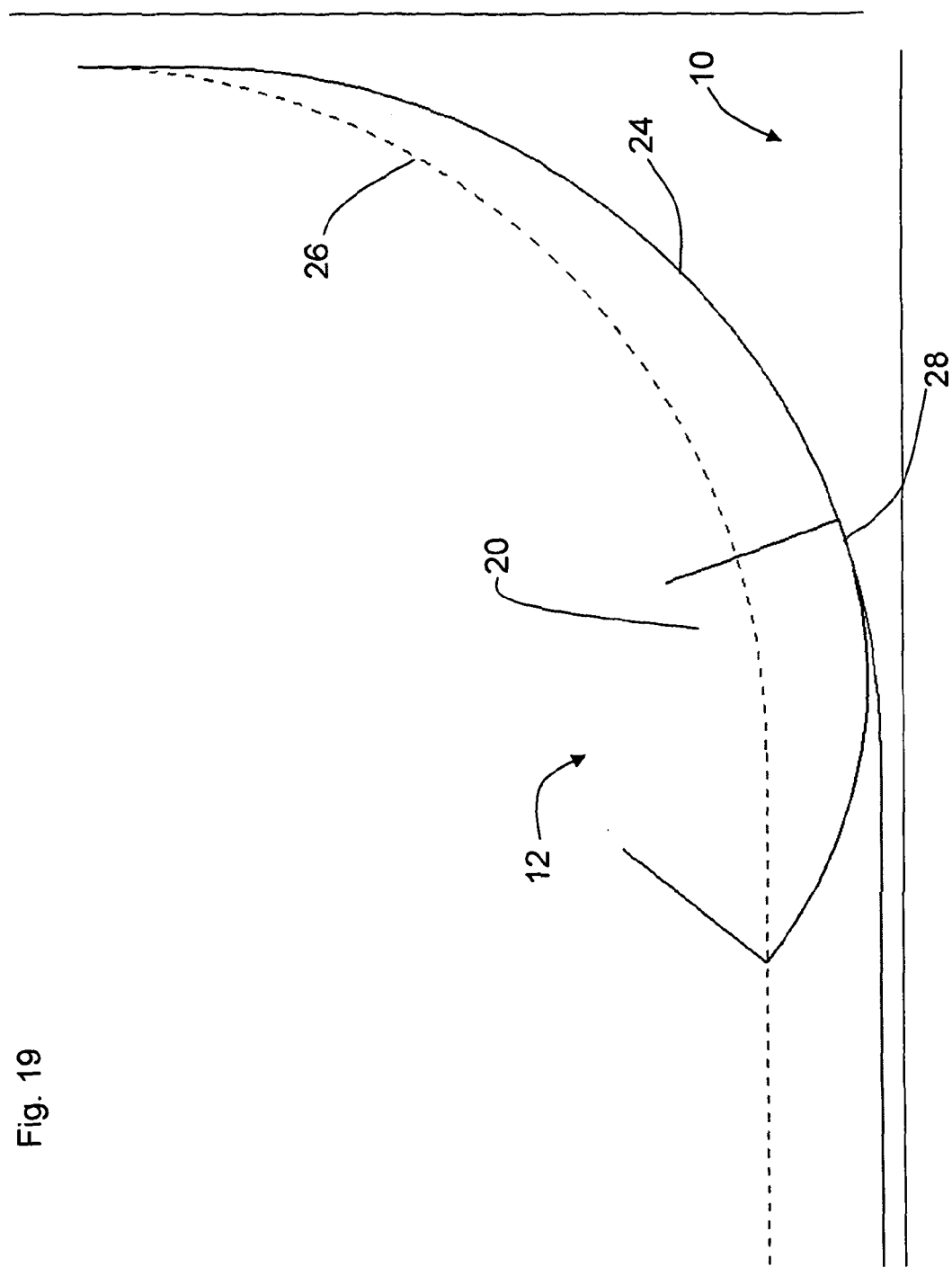
Figure 20:
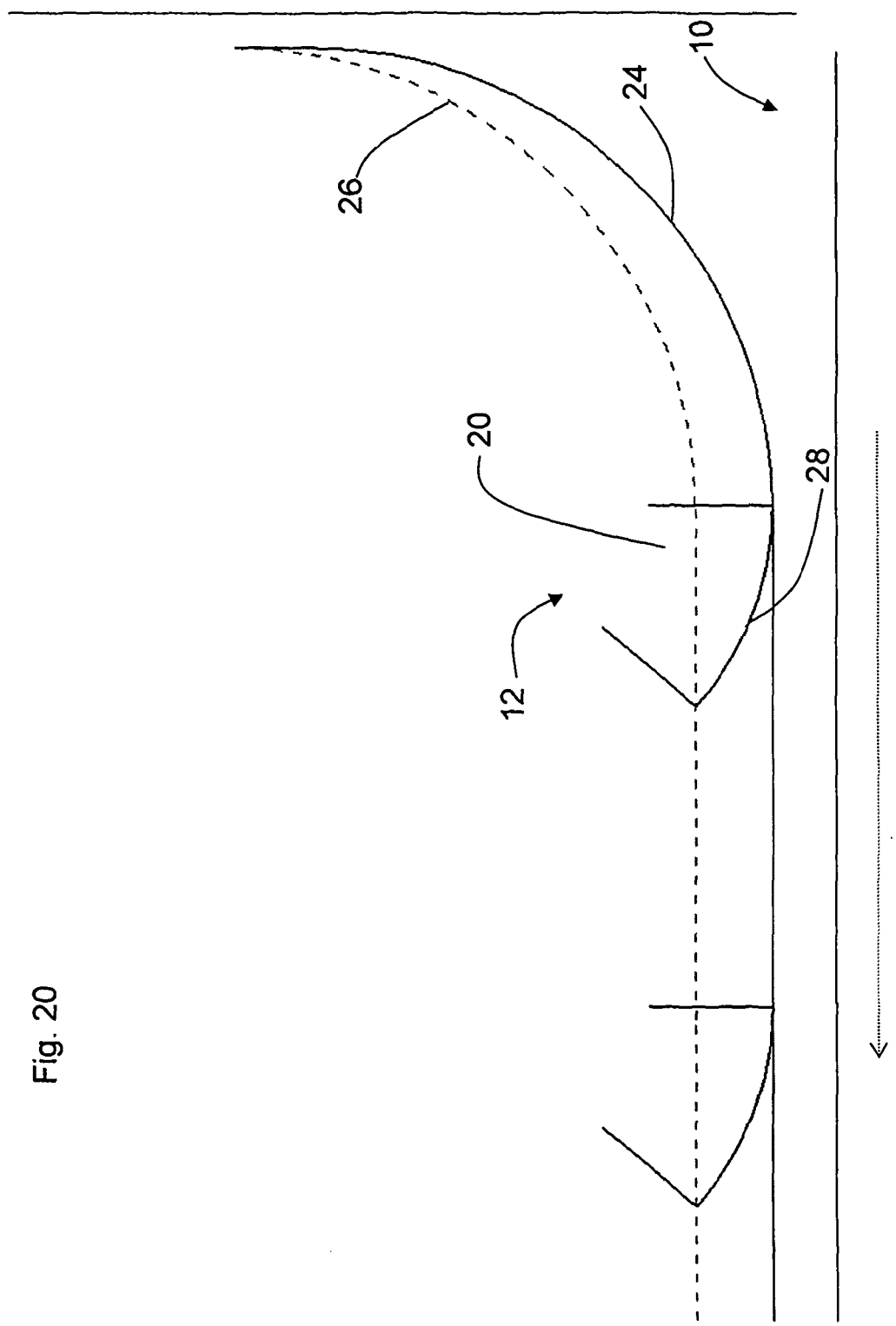
FIG. 20 is a schematic illustration showing movement of a cutting tool along a linear path at a predetermined depth of cut.

From FIG. 13, it can be seen that the tool 12 has been rolled further into cut and the arc of engagement 28 (i.e. the circumferential distance between the tangential point of contact of the tool with the desired surface 24 and the point at which the tool meets the exposed surface 26) has increased. In FIG. 14, the tool 12 has been rolled still further into cut and the length of the arc of engagement 28 has increased further. This continues through FIGS. 15 to 18. However, after the tool 12 has moved substantially along its pre-defined path of curvature (rolling into cut), the arc of engagement may eventually begin to decrease (e.g. as shown in FIG. 19) as the tool reaches the predefined location to begin its linear movement at the predefined depth of cut (e.g. as shown in FIG. 20).

The feed rate prior to engagement of the tool 12 with the workpiece 10 (i.e. when the length of the arc of engagement 28 is zero) is high, e.g. in the region of 0.6 mm/revolution for certain applications. However, the control system 22 is programmed to modify the feed rate in relation to the arc of engagement 28 between the tool 12 and the workpiece 10 as is moved to produce the programmed surface 24.

In general terms, the feed rate is reduced as the arc of engagement increases. Hence, in exemplary embodiments, the feed rate for a first arc of engagement is greater than the feed rate for a second arc of engagement, if the second arc of engagement is greater than the first arc of engagement. For FIGS. 12 to 18, the feed rate is programmed to decrease during movement of the tool, since it is known that the length of the arc of engagement 34 increases during this particular part of the predefined path of curvature. However, for FIGS. 19 and 20, the feed rate is programmed to increase, since it is known that this movement of the tool along this part of the path 30 will result in a decrease in the length of the arc of engagement.

By controlling the feed rate in this manner, it has been possible to control the thickness of the material which is removed from the workpiece 10 as the tool 12 rolls into cut, reducing the likelihood of coil generation and to reducing temperature loading on the tool (thereby further improving the longevity of the tool). For particular materials, the envelop between 'too thin' (resulting in a sustained coil) and 'too thick' (resulting in tool failure) may be as little as 0.05 mm. It will be understood that such intricate control cannot be achieved manually.

As described above, the feed rate during linear cutting movement of the tool 12 (i.e. with cutting head 20 travelling along a portion of the workpiece 10 in a straight line at a desired depth of cut in the exposed surface 26) may be set at the optimal level for the machine and the type of material used. This will typically be much higher than the feed rate as the tool 12 rolls into cut.

Figure 21:
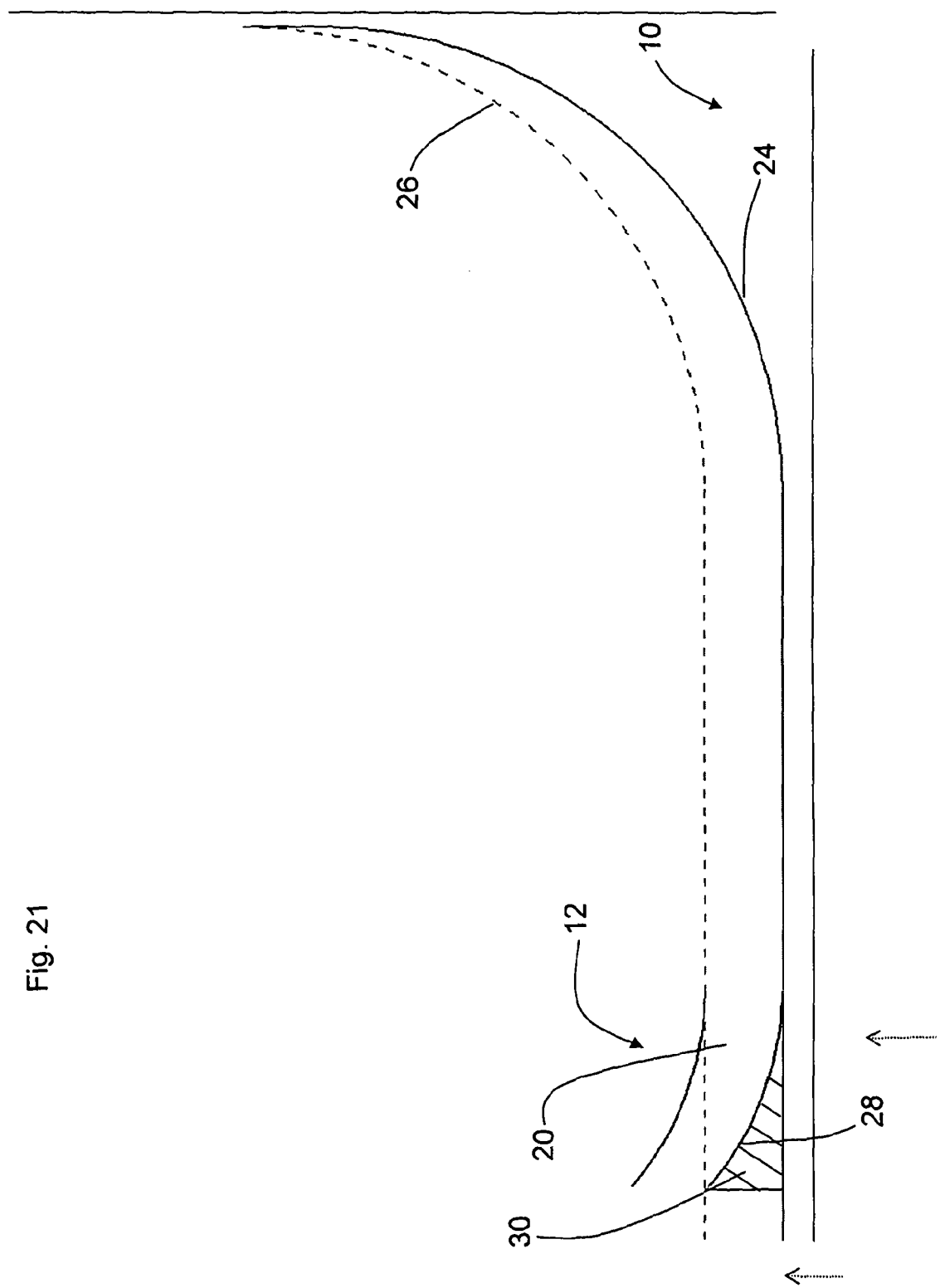
FIG. 21 is a schematic illustration showing withdrawal of a cutting tool from a workpiece at the end of a first pass.
Figure 22:
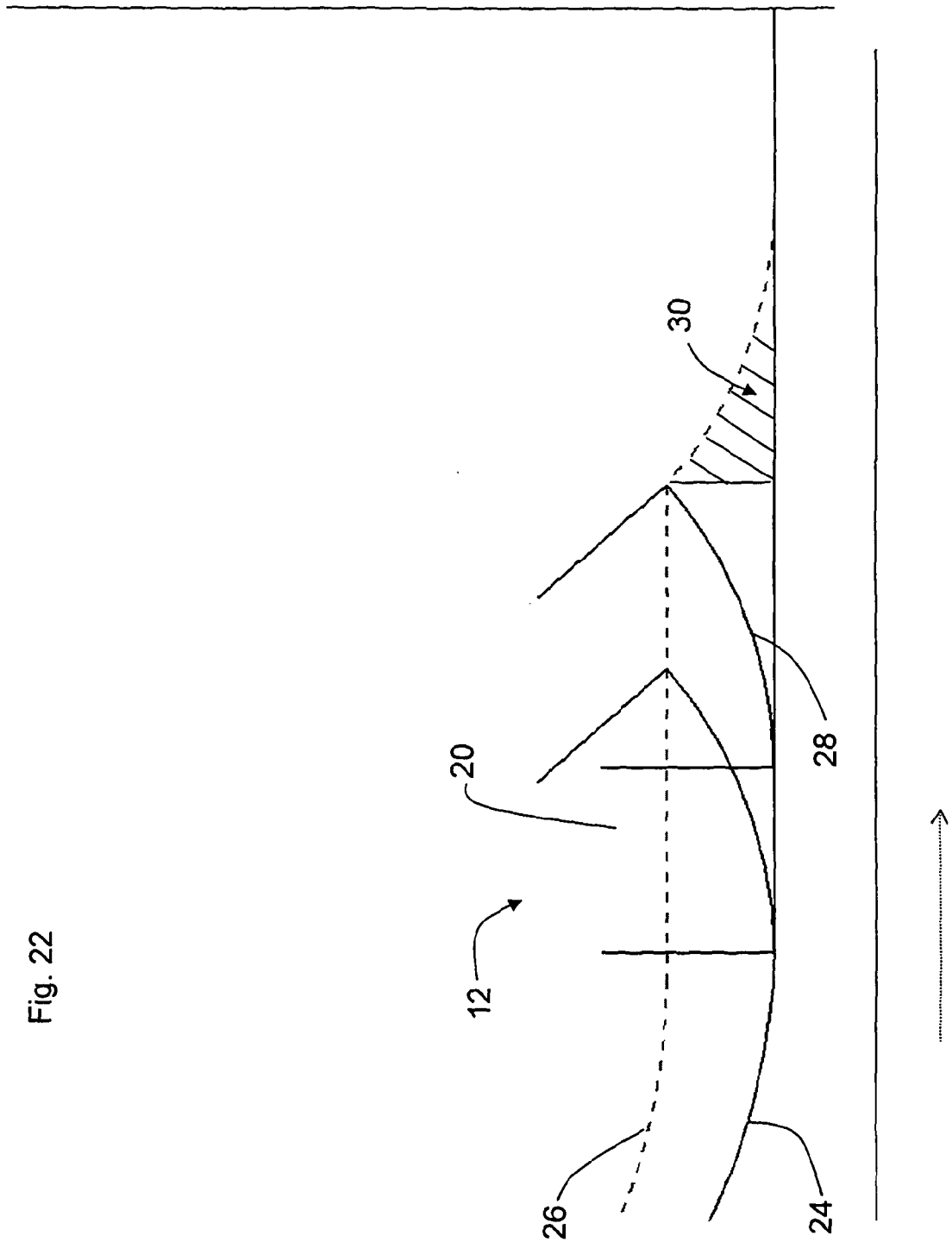
FIGS. 22 to 26 are schematic illustrations showing a change in arc of engagement between a cutting tool and a workpiece as the cutting tool makes a second pass at a predetermined depth of cut.
Figure 23:
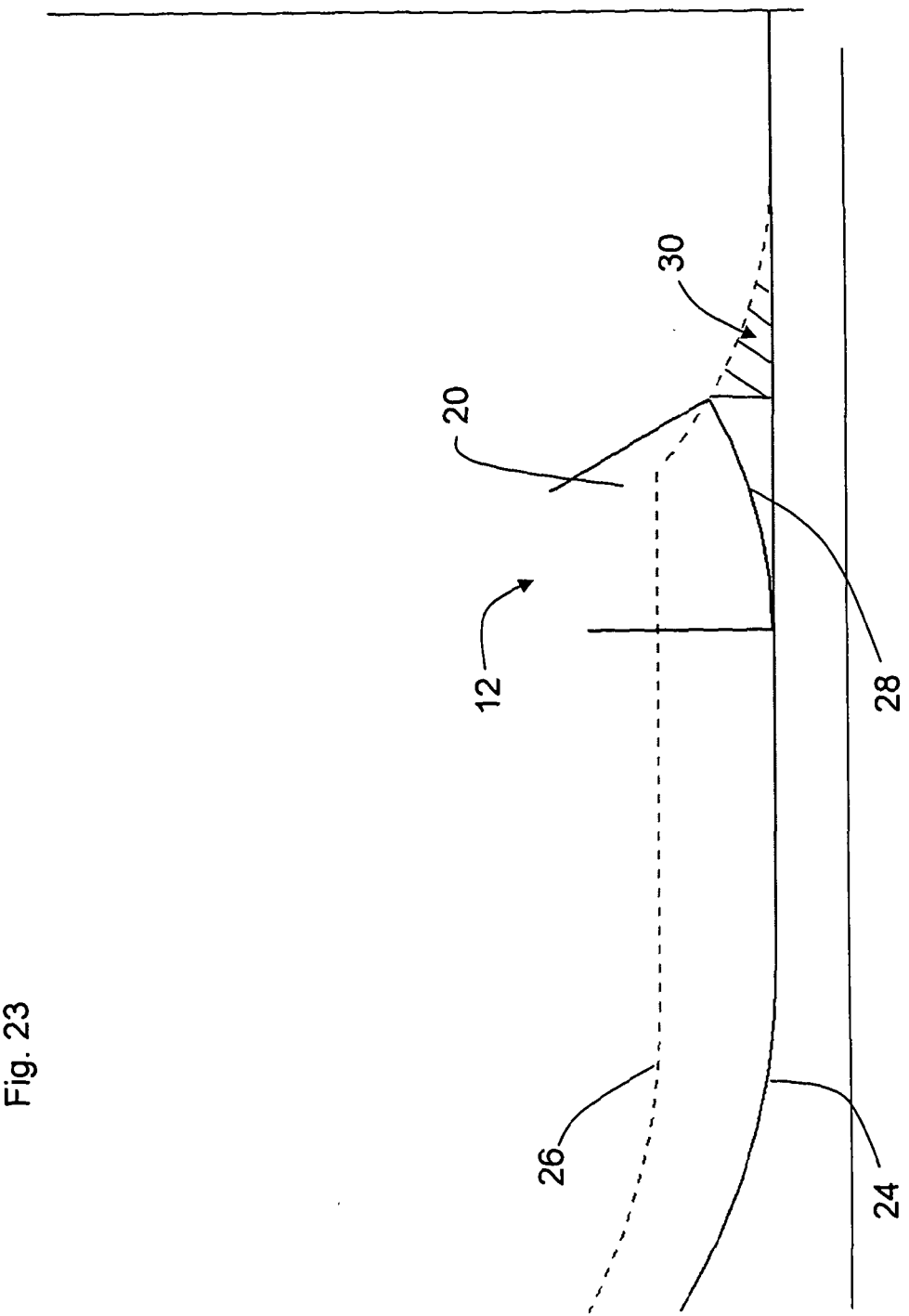
Figure 24:
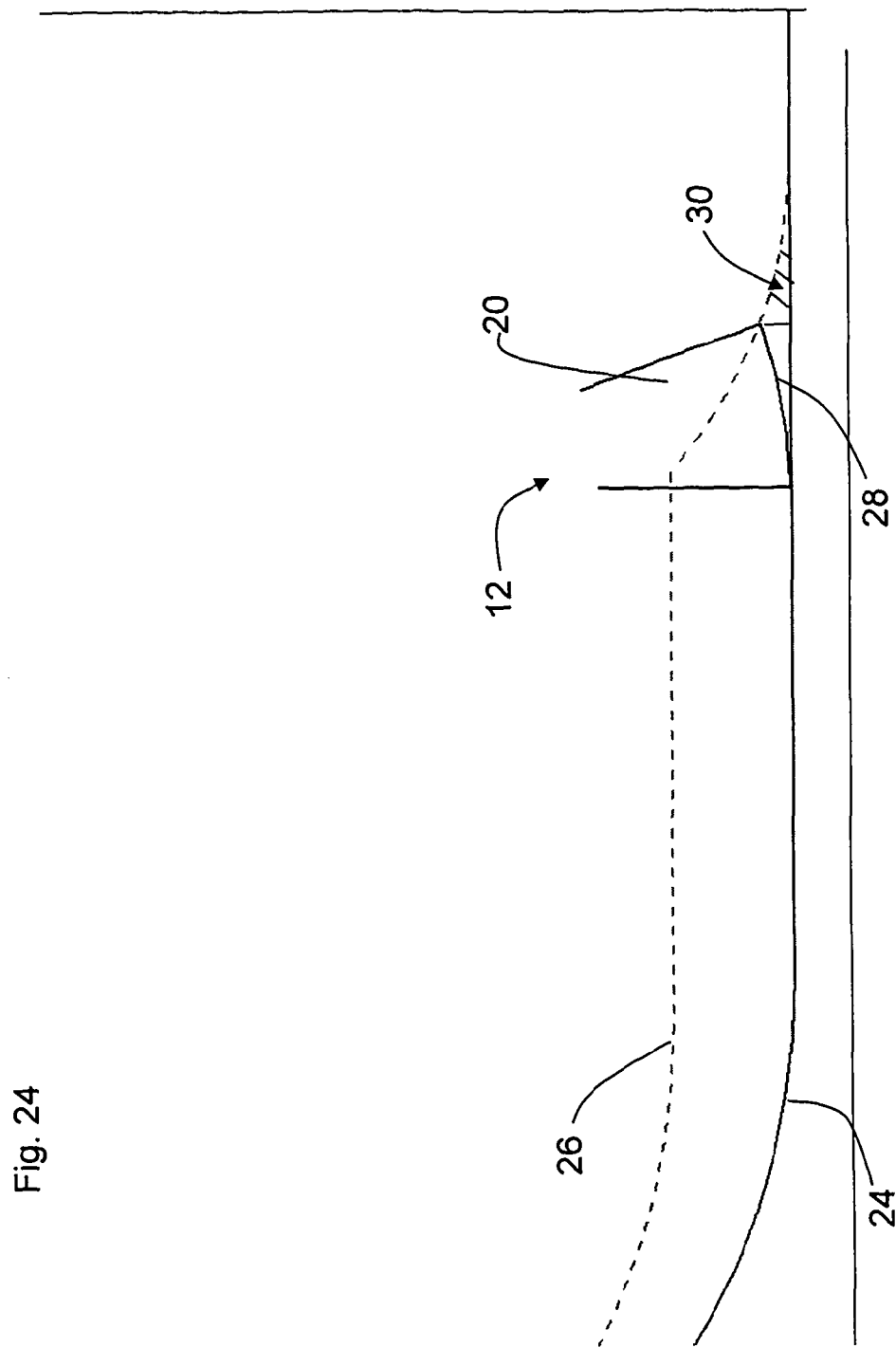
Figure 25:
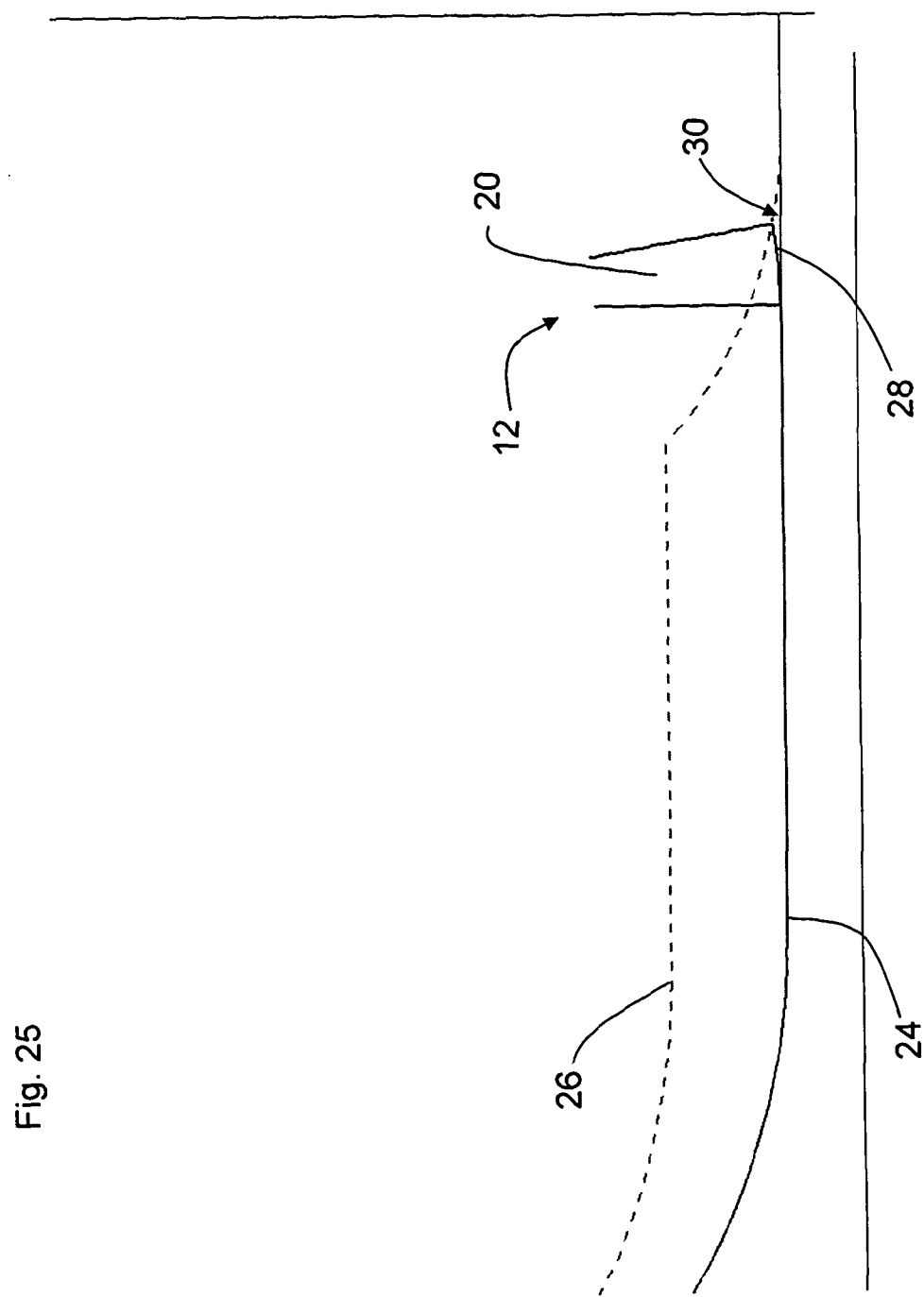
Figure 26:
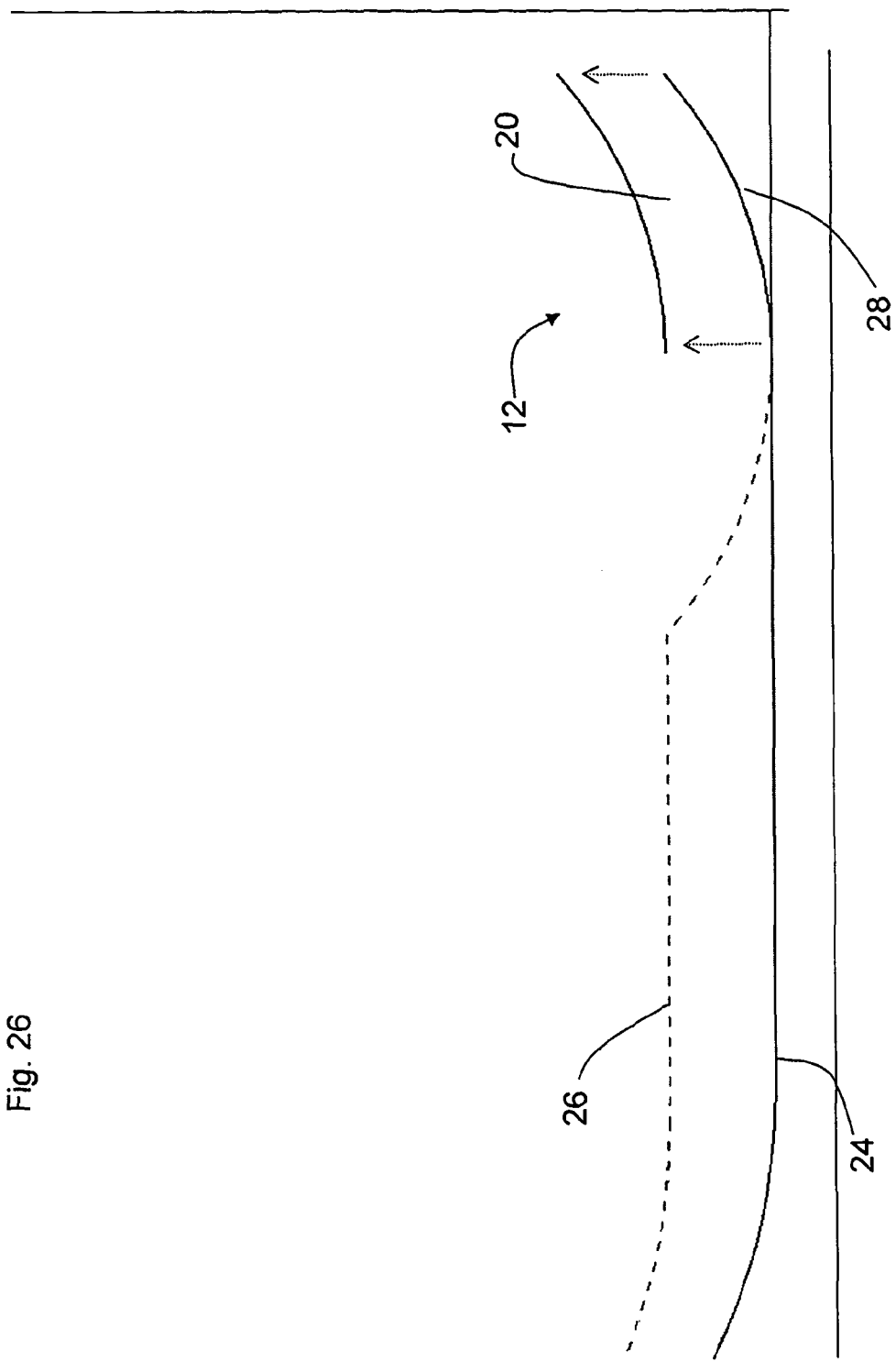

The tool 12 is then withdrawn from the workpiece at the end of the first pass. In exemplary embodiments, the tool is moved out of cut abruptly, e.g. withdrawn in a linear direction immediately away from the workpiece (as opposed to rolling out of cut). FIG. 21 shows an example wherein the tool has been withdrawn in a direction substantially orthogonal to the direction of linear movement in cut during the first pass. This leaves a transition region 30 between the exposed surface 26 and the programmed surface 24. In such embodiments, the movement out of cut on the second pass is then controlled, in order to reduce the risk of coil generation as the tool approaches the material 30 left behind at the end of the first pass. In particular, the feed rate on the second pass is programmed to vary as the tool passes through the material left behind at the end of the first pass (e.g. in a manner similar to that described as the tool rolls into cut), in order to control chip thickness and to reduce the likelihood of coil generation at the end of the second pass. This means that feed rate on the second pass can be programmed to increase as the arc of engagement between the tool and the material 30 decreases. FIG. 22 shows movement of the cutting tool 12 in a linear direction (to the right as viewed) as it approaches the region 30. By comparison between FIGS. 22 to 25 it can be seen that the arc of engagement between the cutting head 20 and the region 30 decreases with further linear movement of the cutting tool 12, until all of the region has been removed (see FIG. 26), after which point the tool can be withdrawn (e.g. in a direction substantially orthogonal to the direction of linear movement in cut during the second pass).

Again, controlling the feed rate in relation to changes in the arc of engagement results in a controlled chip thickness, reducing the likelihood of coil generation. It will be understood that such intricate control cannot be achieved manually.

Implementation of the invention has been found to significantly reduce the generation of swarf coils, thereby reducing the need for manual intervention during turning operations and improving overall efficiency, as well as improving tool life.

The method described herein is particularly suited to machining of heat resistant super alloys and materials such as Titanium, e.g. in the production of components for gas turbines, e.g. gas turbine discs, casings, rings etc.

The invention claimed is:

1. A method of removing stock from a rotating workpiece, the method comprising:
    turning a workpiece and controlling the position of a cutting tool relative to the workpiece in order to remove stock from the workpiece, wherein an electronic control system controls movement of the cutting tool relative to the workpiece in order to cut a predefined feature into a predefined location on the workpiece,
    wherein the control system operates an automated cutting cycle in which the cutting tool is moved in a first direction relative to the workpiece in order to make a first pass and remove stock from the workpiece, the tool is withdrawn from the workpiece after the first pass, and the cutting tool is then moved in a second direction, different to said first direction, to make a second pass and remove stock from the workpiece, wherein for the first pass of the cutting cycle, the cutting tool is rolled into cut at a first position on the workpiece and moved out of cut at a second position, and for the second pass of the cutting cycle, the cutting tool is rolled into cut at a third position on the workpiece and moved out of cut at a fourth position, wherein the third position is remote from the first position, and the second position is between the third position and the first position, and wherein the control system repeats said automated cutting cycle in order to progressively cut said predefined feature into said predefined location on the workpiece using a series of alternating passes of the cutting tool,
    wherein each of said first and second passes of the cutting tool involves movement of the cutting tool towards the workpiece in order to bring a cutting surface of the cutting tool into engagement with the workpiece, wherein after engagement of the cutting tool with the workpiece, movement of the cutting tool is controlled to roll the cutting tool into the cut, wherein the cutting tool follows a curved path while rolling into the cut until the cutting surface of the cutting tool reaches a predetermined depth of cut in the workpiece; and
    wherein the cutting tool has first and second cutting surfaces which are used alternately in the cutting cycle, so that the first cutting surface is used for the first pass of the tool relative to the workpiece and the second cutting surface is used for the second pass of the cutting tool relative to the workpiece.

2. The method according to claim 1 wherein, after engagement of the cutting tool with the stock, each of said first and second passes of the cutting tool involves movement of the cutting tool along a portion of the workpiece with the cutting surface of the cutting tool at a predefined depth from an exposed surface of the stock, in order to cut a portion of stock from the workpiece, and movement of the cutting tool away from the workpiece, in order to withdraw the cutting surface of the cutting tool from the stock, and wherein after the cutting tool reaches the predetermined depth of cut in the stock, the cutting tool is then controlled to follow a straight/linear path, with the cutting surface of the tool engaged with the stock at said predetermined depth of cut.

3. The method according to claim 1 wherein the control system is programmed for controlling the thickness of the stock which is removed from the workpiece as the cutting tool rolls into cut to remain within a desired thickness range.

4. The method according to claim 1 wherein the control system is programmed to control movement of the cutting tool along a known path of curvature as the cutting tool rolls into cut, and to vary the feed rate in order to control the chip thickness as the cutting tool rolls into cut along said known path of curvature.

5. The method according to claim 4 wherein the feed rate as the cutting tool rolls into cut is programmed to vary in relation to an arc of engagement between a cutting surface of the cutting tool and the stock into which the cutting tool is being moved.

6. The method according to claim 4 wherein the feed rate decreases in relation to an increase in an arc of engagement.

7. The method according to claim 5 wherein a feed rate for a first arc of engagement is greater than a feed rate for a second arc of engagement, if the second arc of engagement is greater than the first arc of engagement.

8. The method according to claim 7 wherein the feed rate for a third arc of engagement is less than the feed rate for the second arc of engagement, if the third arc of engagement is greater than the second arc of engagement, and wherein the feed rate for the third arc of engagement is greater than the feed rate for the second arc of engagement, if the third arc of engagement is less than the second arc of engagement.

9. The method according to claim 5 wherein the feed rate after the cutting tool has rolled into cut on the first pass is constant at least until movement out of cut.

10. The method according to claim 1 wherein the tool is moved out of cut abruptly at the end of the first pass.

11. The method according to claim 10 wherein the tool is withdrawn abruptly at the end of the first pass, the cutting tool is rolled into cut for the second pass and then controlled to move in a linear direction opposite to the linear direction of movement in the first pass, and wherein the feed rate varies as the tool passes through stock left behind at the end of the first pass.

12. The method according to claim 11 wherein the feed rate is programmed to vary in relation to an arc of engagement between a cutting surface of the cutting tool and the material left behind at the end of the first pass.

13. The method according to claim 12 wherein the feed rate as the cutting tool moves out of cut on the second pass increases as the arc of engagement between the tool and the material left from the first pass decreases.

14. The method according to claim 1 wherein the cutting tool includes a cutting head which is at least partly spherical.

15. The method according to claim 1 wherein the cutting tool has a cutting surface of known curvature, and wherein a first part/arc of the cutting surface is used for the first pass of the cutting cycle and a second part/arc of the cutting surface is used for the second pass of the cutting cycle.

16. The method according to claim 1, wherein the control system is programmed to control movement of the cutting tool along a known path of curvature as the tool rolls into cut, and to decrease the feed rate if the arc of engagement between the tool and the workpiece increases as the cutting tool rolls into cut along said known path of curvature.

17. The method according to claim 1, wherein the fourth position is between the third position and the first position.

18. A non-transitory computer-readable storage medium, storing instructions that when executed by a processor, cause the processor to control movement of a cutting tool to remove stock from a rotating workpiece, by performing steps comprising:

engaging a first cutting surface of the cutting tool with the workpiece at a first position;

controlling the first cutting surface of the cutting tool to follow a defined path of curvature until the first cutting surface reaches a desired depth of cut;

controlling the cutting tool to follow a first linear path while the first cutting surface is engaged with a stock of the workpiece;

controlling a thickness of the workpiece with the cutting tool by removing material from the workpiece;

controlling a thickness of the removed material from the workpiece;

controlling a feed rate of the cutting tool;

controlling the cutting tool to disengage the workpiece at a second position;

engaging a second cutting surface of the cutting tool with the workpiece at a third position, the third position remote from the first position, and wherein the second position is between the first position and the third position;

controlling the second cutting surface of the tool to engage the workpiece at the third position, the cutting tool following a defined path of curvature until the second cutting surface reaches a desired depth of cut;

controlling the tool to follow a second linear path while the second cutting surface is engaged with a stock of the workpiece;

controlling the thickness of the workpiece with the cutting tool by removing material from the workpiece;

controlling a thickness of the removed material from the workpiece along the second linear path; and controlling the feed rate of the cutting tool along the second path; and controlling the cutting tool to disengage the workpiece at a fourth position.

19. A method of removing stock from a rotating workpiece, the method comprising the steps of:

turning a workpiece and controlling the position of a cutting tool relative to the workpiece in order to remove stock from the workpiece, wherein the method involves a pre-programmed cutting cycle in which the cutting tool is moved relative to the workpiece in order to engage the workpiece and remove stock from the workpiece, and is then withdrawn from the workpiece, wherein the cutting tool is controlled to roll into cut along a predefined curved path until a cutting surface of the tool reaches a predetermined depth of cut in the workpiece, and the feed rate as the cutting tool rolls into cut along said curved path is varied in relation to an arc of engagement between a cutting surface of the cutting tool and the stock into which the cutting tool is being moved, and wherein the cutting tool has first and second cutting surfaces which are used alternately in the pre-programmed cutting cycle, so that the first cutting surface is used for a first pass of the tool relative to the workpiece and the second cutting surface is used for a second pass of the cutting tool relative to the workpiece, and wherein the cutting tool engages the workpiece at a first position of the first pass and disengages the workpiece at a second position of the first pass, and reengages the workpiece at a third position of the second pass and disengages the workpiece at a fourth position of the second pass, and wherein the first position is remote to the third position, and the second position is located between the first position and the third position.

20. The method of claim 19, wherein the second position is located in a region of 25 percent to 75 percent of a distance between the first position and the third position.

* * * * *